US012592018B1

(12) United States Patent
Villanueva Aylagas et al.

(10) Patent No.: US 12,592,018 B1
(45) Date of Patent: Mar. 31, 2026

(54) GENERATING EXPRESSIVE FACIAL ANIMATION DATA FROM SPEECH AUDIO USING SPEECH EMOTION RECOGNITION

(71) Applicant: Electronic Arts Inc., Redwood City, CA (US)

(72) Inventors: Monica Villanueva Aylagas, Sundbyberg (SE); Mattias Teye, Sundbyberg (SE); Hector Leon, Malmö (SE); Damian Valle, Stockholm (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 297 days.

(21) Appl. No.: 18/128,995

(22) Filed: Mar. 30, 2023

Related U.S. Application Data

(60) Provisional application No. 63/327,647, filed on Apr. 5, 2022, provisional application No. 63/327,633, filed on Apr. 5, 2022.

(51) Int. Cl.
  *G06T 13/40* (2011.01)
  *G10L 15/16* (2006.01)
  *G10L 25/63* (2013.01)
(52) U.S. Cl.
  CPC .............. *G06T 13/40* (2013.01); *G10L 15/16* (2013.01); *G10L 25/63* (2013.01)
(58) Field of Classification Search
  CPC .......... G06T 13/40; G10L 15/16; G10L 25/63
  USPC ........................................................ 345/473
  See application file for complete search history.

(56) References Cited

U.S. PATENT DOCUMENTS

| | | | | |
|---|---|---|---|---|
| 10,176,619 B2 * | 1/2019 | Jiao | ......................... | G06T 7/246 |
| 11,349,989 B2 * | 5/2022 | Murali | .................... | G10L 17/26 |
| 11,756,251 B2 * | 9/2023 | Kaushik | .................. | G10L 25/63 |
| | | | | 345/473 |
| 2021/0319610 A1 * | 10/2021 | del val Santos | ....... | G06N 20/20 |

FOREIGN PATENT DOCUMENTS

| | | | | |
|---|---|---|---|---|
| CN | 113393832 A | * | 9/2021 | ............. G10L 25/63 |

OTHER PUBLICATIONS

A. Van den Oord et al., "WaveNet: A Generative Model for Raw Audio" Sep. 19, 2016, Speech Synthesis Workshop, 15 pages (Year: 2016).*

(Continued)

*Primary Examiner* — David T Welch
*Assistant Examiner* — Ryan Allen Barham
(74) *Attorney, Agent, or Firm* — Gray Ice Higdon

(57) ABSTRACT

This specification provides a computer-implemented method for generating facial animation data. The facial animation data animates a face in a video game in accordance with speech sounds and speech emotion of speech audio. Speech audio data representing the speech audio is processed using a machine-learned speech emotion recognition model. One or more emotion representations that represent the emotion of the speech audio are generated. For each of the one or more emotion representations, a respective conditioning input for a facial animation generative model is determined. Facial animation data for the speech audio data is generated, comprising processing, using the facial animation generative model: (i) input data derived from the speech audio data, and (ii) the one or more conditioning inputs.

17 Claims, 9 Drawing Sheets

(56)　　　　　References Cited

OTHER PUBLICATIONS

X. Wu et al., "F³A-GAN: Facial Flow for Face Animation With Generative Adversarial Networks," in IEEE Transactions on Image Processing, vol. 30, pp. 8658-8670, 2021. (Year: 2021).*

Karras et al, "Audio-driven facial animation by joint end-to-end learning of pose and emotion" (Year: 2017).*

Li, Zhi, Anne Aaron, Ioannis Katsavounidis, Anush Moorthy, and Megha Manohara, "Toward a practical perceptual video quality metric," The Netflix Tech Blog 6, No. 2: 2, Jun. 6, 2016.

Lin, Ji, Richard Zhang, Frieder Ganz, Song Han, and Jun-Yan Zhu, "Anycost gans for interactive image synthesis and editing," In Proceedings of the IEEE/CVF Conference on Computer Vision and Pattern Recognition, pp. 14986-14996, 2021.

Lithgow, K. and Edge, J, "Surrey AudioVisual Expressed Emotion (SAVEE) Database," URL: http://kahlan.eps.surrey.ac.uk/savee/. Apr. 2, 2015.

Livingstone, Steven R., and Frank A. Russo, "The Ryerson Audio-Visual Database of Emotional Speech and Song (RAVDESS): A dynamic, multimodal set of facial and vocal expressions in North American English," PloS one 13, No. 5: e0196391, May 16, 2018.

Luo, Changwei, Jun Yu, Xian Li, and Leilei Zhang, "Hmm based speech-driven 3D tongue animation," In 2017 IEEE International Conference On Image Processing (ICIP), pp. 4377-4381, IEEE, Sep. 2017.

News, Guinness World Records. Star Wars: The Old Republic Recognised Guinness World Records 2012 Gamer's Edition, URL: https://www.guinnessworldrecords.com, Retrieved on: Dec. 17, 2021.

Nwe, Tin Lay, Say Wei Foo, and Liyanage C. De Silva, "Speech emotion recognition using hidden Markov models," Speech communication 41, No. 4: 603-623, Nov. 2003.

Orvalho, Verónica, Pedro Bastos, Frederic I. Parke, Bruno Oliveira, and Xenxo Alvarez, "A Facial Rigging Survey," Eurographics (State of the Art Reports): 183-204, 2012.

Paszke, Adam, Sam Gross, Francisco Massa, Adam Lerer, James Bradbury, Gregory Chanan, Trevor Killeen et al, "Pytorch: An imperative style, high-performance deep learning library," Advances in neural information processing systems 32, 2019.

Patamia, Rutherford Agbeshi, Wu Jin, Kingsley Nketia Acheampong, Kwabena Sarpong, and Edwin Kwadwo Tenagyei, "Transformer based multimodal speech emotion recognition with improved neural networks," In 2021 IEEE 2nd International Conference on Pattern Recognition and Machine Learning (PRML), pp. 195-203, IEEE, 2021.

Pelachaud, Catherine, Cornelius Wam Van Overveld, and Chin Seah, "Modeling and animating the human tongue during speech production," In Proceedings of Computer Animation'94, pp. 40-49. IEEE, May 1994.

Pham, Hai Xuan, Yuting Wang, and Vladimir Pavlovic, "End-to-end learning for 3d facial animation from raw waveforms of speech." arXiv preprint arXiv:1710.00920 Dec. 7, 2017.

Richard, Alexander, Colin Lea, Shugao Ma, Jurgen Gall, Fernando De La Torre, and Yaser Sheikh, "Audio-and gaze-driven facial animation of codec avatars," In Proceedings of the IEEE/CVF winter conference on applications of computer vision, pp. 41-50, 2021.

Richard, Alexander, Michael Zollhoefer, Yandong Wen, Fernando De La Torre, and Yaser Sheikh, "MeshTalk: 3D Face Animation from Speech using Cross-Modality Disentanglement," arXiv preprint arXiv:2104.08223, Apr. 16, 2021.

Schneider, Steffen, Alexei Baevski, Ronan Collobert, and Michael Auli, "wav2vec: Unsupervised pre-training for speech recognition," arXiv preprint arXiv:1904.05862, Sep. 11, 2019.

Schwartz, Roy, Jesse Dodge, Noah A. Smith, and Oren Etzioni, "Green AI," arXiv preprint arXiv:1907.10597, Aug. 13, 2019.

SG, Speech Graphics, URL: https://www.speech-graphics.com/, Retrieved on: Sep. 3, 2021.

Si, Shijing, Jianzong Wang, Xiaoyang Qu, Ning Cheng, Wenqi Wei, Xinghua Zhu, and Jing Xiao, "Speech2video: Cross-modal distillation for speech to video generation," arXiv preprint arXiv:2107.04806, Jul. 10, 2021.

Sohn, Kihyuk, Honglak Lee, and Xinchen Yan, "Learning structured output representation using deep conditional generative models," Advances in neural information processing systems 28, 2015.

Taylor, Sarah, Taehwan Kim, Yisong Yue, Moshe Mahler, James Krahe, Anastasio Garcia Rodriguez, Jessica Hodgins, and Iain Matthews, "A deep learning approach for generalized speech animation," ACM Transactions On Graphics (TOG) 36, No. 4: Jul. 1-11, 2017.

Theis, Lucas, Aäron Van Den Oord, and Matthias Bethge, "A note on the evaluation of generative models," arXiv preprint arXiv:1511.01844, Nov. 5, 2015.

Tzirakis, Panagiotis, Athanasios Papaioannou, Alexandros Lattas, Michail Tarasiou, Björn Schuller, and Stefanos Zafeiriou, "Synthesising 3D facial motion from "in-the-wild" speech," In 2020 15th IEEE International Conference on Automatic Face and Gesture Recognition (FG 2020), pp. 265-272, IEEE, Apr. 15, 2019.

Vaessen, Nik, and David A. Van Leeuwen, "Fine-tuning wav2vec2 for speaker recognition," arXiv preprint arXiv:2109.15053, Sep. 30, 2021.

Verma, Ashish, Nitendra Rajput, and L. Venkata Subramaniam, "Using viseme based acoustic models for speech driven lip synthesis," In 2003 IEEE International Conference on Acoustics, Speech, and Signal Processing, 2003, Proceedings.(ICASSP'03)., vol. 5, pp. V-720, IEEE, Apr. 6, 2003.

Wang, Chengyi, Yu Wu, Sanyuan Chen, Shujie Liu, Jinyu Li, Yao Qian, and Zhenglu Yang, "Self- supervised learning for speech recognition with intermediate layer supervision," arXiv preprint arXiv:2112.08778, Dec. 16, 2021.

Yang, Lin, Yi Shen, Yue Mao, and Longjun Cai, "Hybrid Curriculum Learning for Emotion Recognition in Conversation," arXiv preprint arXiv:2112.11718 Dec. 22, 2021.

Yannakakis, Georgios N., Roddy Cowie, and Carlos Busso, "The ordinal nature of emotions: An emerging approach," IEEE Transactions on Affective Computing 12, No. 1: 16-35, 2018.

Zachary C. Lipton, and Subarna Tripathi, "Precise Recovery of Latent Vectors from Generative Adversarial Networks", 5th International Conference on Learning Representations, ICLR 2017, Toulon, France, Apr. 24-26, 2017, Workshop Track Proceedings, Open-Review.net, Feb. 17, 2017.

Zhang, Yuanyuan, Jun Du, Zirui Wang, and Jianshu Zhang, "Attention Based Fully Convolutional Network for Speech Emotion Recognition," arXiv preprint arXiv:1806.01506, Jun. 5, 2018.

Zhou, Yang, Zhan Xu, Chris Landreth, Evangelos Kalogerakis, Subhransu Maji, and Karan Singh, "Visemenet: Audio-driven animator-centric speech animation," ACM Transactions on Graphics (TOG) 37, No. 4: Aug. 1-10, 2018.

Zhou, Yang, Zhan Xu, Chris Landreth, Evangelos Kalogerakis, Subhransu Maji, and Karan Singh, "VisemeNet: Audio-Driven Animator-Centric Speech Animation," arXiv preprint arXiv:1805.09488, May 24, 2018.

Zhu, Lixing, Gabriele Pergola, Lin Gui, Deyu Zhou, and Yulan He, "Topic-Driven and Knowledge-Aware Transformer for Dialogue Emotion Detection," In Proceedings of the 59th Annual Meeting of the Association for Computational Linguistics and the 11th International Joint Conference on Natural Language Processing (vol. 1: Long Papers), pp. 1571-1582, Aug. 1, 2021.

Nvidia, Omniverse Audio 2Face, https://www.nvidia.com/en-us/omniverse/apps/audio2face/, Retrieved on: May 22, 2023.

Speech Graphics, SGX, https://www.speech-graphics.com/sgx-production-audio-to-face-animation-software/; Retrieved on: May 22, 2023.

Abdelaziz, Ahmed Hussen, et al., "Audiovisual Speech Synthesis using Tacotron2," arXiv preprint arXiv:2008.00620 Aug. 3, 2020.

Peng, Ziqiao, et al., "EmoTalk: Speech-driven emotional disentanglement for 3D face animation," arXiv preprint arXiv:2303.11089 , Mar. 20, 2023.

Eskimez, Sefik Emre, et al., "Speech driven talking face generation from a single image and an emotion condition," IEEE Transactions on Multimedia 24: 3480-3490 Jul. 21, 2021.

(56) References Cited

OTHER PUBLICATIONS

Wang, Kaisiyuan, et al., "Mead: A large-scale audio-visual dataset for emotional talking-face generation." Computer Vision-ECCV 2020: 16th European Conference, Glasgow, UK, Aug. 23-28, 2020, Proceedings, Part XXI. Cham: Springer International Publishing, Aug. 23, 2020.

Zeng, Dan et al., "Talking face generation with expression-tailored generative adversarial network," Proceedings of the 28th ACM International Conference on Multimedia, Supplemental Material Video Retrieved from: https://dl.acm.org/doi/10.1145/3394171. 3413844, dated 2020.

Sadiq, Rizwan, et al., "Emotion Dependent Facial Animation from Affective Speech." 2020 IEEE 22nd International Workshop on Multimedia Signal Processing (MMSP). IEEE, 2020.

Bolduc, Maquis et al., "Rig Inversion by Training a Differentiable Rig Function," SIGGRAPH Asia 2022 Technical Communications, Jan. 4, 2022.

Medina, Salvador, et al., Speech Driven Tongue Animations, Proceedings of the IEEE/CVF Conference on Computer Vision and Pattern Recognition (CVPR), 2022.

Fan, Yingruo, et al., "Faceformer: Speech-driven 3d facial animation with transformers," Proceedings of the IEEE/CVF Conference on Computer Vision and Pattern Recognition, 2022.

Bao, Linchao et al., "Learning Audio-Driven Viseme Dynamics for 3D Face Animation," arXiv preprint arXiv:2301.06059, Jan. 15, 2023.

Tarantino, L., et al., Self-Attention for Speech Emotion Recognition. Proc. Interspeech 2019, 2578-2582, doi: 10.21437/Interspeech. 2019-2822, Sep. 15, 2019.

Li, Y., et al., ) Improved End-to-End Speech Emotion Recognition Using Self Attention Mechanism and Multitask Learning. Proc. Interspeech 2019, 2803-2807, doi: 10.21437/Interspeech.2019-2594, Sep. 15, 2019.

Abdal, Rameen, Yipeng Qin, and Peter Wonka, "Image2stylegan++: How to edit the embedded images?," In Proceedings of the IEEE/CVF conference on computer vision and pattern recognition, pp. 8296-8305, 2020.

Abrevaya, Victoria Fernández, Adnane Boukhayma, Philip HS Torr, and Edmond Boyer, "Cross-modal deep face normals with deactivable skip connections," In Proceedings of the IEEE/CVF Conference on Computer Vision and Pattern Recognition, pp. 4979-4989, 2020.

Baevski, Alexei, Henry Zhou, Abdelrahman Mohamed, and Michael Auli, "wav2vec 2.0: A Framework for Self-Supervised Learning of Speech Representations," arXiv preprint arXiv:2006.11477 Oct. 22, 2020.

Bailey, Stephen W., Dalton Omens, Paul Dilorenzo, and James F. O'Brien, "Fast and deep facial deformations," ACM Transactions on Graphics (TOG) 39, No. 4: 94-1, Jul. 2020.

Bakker, Iris, Theo Van Der Voordt, Peter Vink, and Jan De Boon, "Pleasure, arousal, dominance: Mehrabian and Russell revisited," Current Psychology 33: 405-421, Jun. 11, 2014.

Benzeghiba, Mohamed, Renato De Mori, Olivier Deroo, Stephane Dupont, Teodora Erbes, Denis Jouvet, Luciano Fissore et al. "Automatic speech recognition and speech variability: A review," Speech communication 49, No. 10-11: 763-786, Feb. 6, 2007.

Bhat, Chitralekha, and Sunil Kopparapu, "Viseme comparison based on phonetic cues for varying speech accents," In Sixteenth Annual Conference of the International Speech Communication Association, Sep. 6, 2015.

Bishop, Chris M., "Training with noise is equivalent to Tikhonov regularization," Neural computation 7, No. 1: 108-116, 1995.

Botha, Johnny, and Heloise Pieterse, "Fake news and deepfakes: A dangerous threat for 21st century information security," In ICCWS 2020 15th International Conference on Cyber Warfare and Security, Academic Conferences and publishing limited, p. 57, 2020.

Brand, Matthew, "Voice puppetry," In Proceedings of the 26th annual conference on Computer graphics and interactive techniques, pp. 21-28, 1999.

Bregler, Christoph, Michele Covell, and Malcolm Slaney, "Video rewrite: Driving visual speech with audio," In Proceedings of the 24th annual conference on Computer graphics and interactive techniques, pp. 353-360, 1997.

Brown, Tom B., Benjamin Mann, Nick Ryder, Melanie Subbiah, Jared Kaplan, Prafulla Dhariwal, Arvind Neelakantan et al. "Language Models are Few-Shot Learners," arXiv preprint arXiv:2005. 14165, Jul. 22, 2020.

Burgess, Christopher P., Irina Higgins, Arka Pal, Loic Matthey, Nick Watters, Guillaume Desjardins, and Alexander Lerchner, "Understanding disentangling in $\beta $-VAE," arXiv preprint arXiv:1804. 03599, Apr. 10, 2018.

Busso, Carlos, Murtaza Bulut, Chi-Chun Lee, Abe Kazemzadeh, Emily Mower, Samuel Kim, Jeannette N. Chang, Sungbok Lee, and Shrikanth S. Narayanan, "IEMOCAP: Interactive emotional dyadic motion capture database," Language resources and evaluation 42: 335-359, Sep. 11, 2008.

Cao, Houwei, David G. Cooper, Michael K. Keutmann, Ruben C. Gur, Ani Nenkova, and Ragini Verma, "Crema-d: Crowd-sourced emotional multimodal actors dataset," IEEE transactions on affective computing 5, No. 4: 377-390, 2014.

Chai, Yujin, Yanlin Weng, Lvdi Wang, and Kun Zhou, "Speech-driven facial animation with spectral gathering and temporal attention," Frontiers of Computer Science 16: 1-10, Sep. 23, 2020.

Chen, Mingyi, Xuanji He, Jing Yang, and Han Zhang, "3-D convolutional recurrent neural networks with attention model for speech emotion recognition," IEEE Signal Processing Letters 25, No. 10: 1440-1444, Oct. 10, 2018.

Chung, Joon Son, Amir Jamaludin, and Andrew Zisserman, "You said that?," arXiv preprint arXiv:1705.02966, Jul. 18, 2017.

Chung, Joon Son, and Andrew Zisserman, "Lip reading in the wild," In Computer Vision—ACCV 2016: 13th Asian Conference on Computer Vision, Taipei, Taiwan, Nov. 20-24, 2016, Revised Selected Papers, Part II 13, pp. 87-103, Springer International Publishing, 2017.

Cootes, Timothy F., Gareth J. Edwards, and Christopher J. Taylor, "Active appearance models," IEEE Transactions on pattern analysis and machine intelligence 23, No. 6: 681-685, 2001.

Cudeiro, Daniel, Timo Bolkart, Cassidy Laidlaw, Anurag Ranjan, and Michael J. Black, "Capture, learning, and synthesis of 3D speaking styles," In Proceedings of the IEEE/CVF Conference on Computer Vision and Pattern Recognition, pp. 10101-10111, 2019.

Devlin, Jacob, Ming-Wei Chang, Kenton Lee, and Kristina Toutanova, "Bert: Pre-training of deep bidirectional transformers for language understanding," arXiv preprint arXiv:1810.04805, Oct. 11, 2018.

Diederik P. Kingma, , and Jimmy BA, "ADAM: A Method for Stochastic Optimization," In 3rd International Conference on Learning Representations, ICLR 2015, San Diego, CA, USA, Conference Track Proceedings, May 7, 2015.

Doersch, Carl, "Tutorial on variational autoencoders," arXiv preprint arXiv:1606.05908, Aug. 13, 2016.

Dossou, Bonaventure FP, and Yeno KS Gbenou, "FSER: Deep Convolutional Neural Networks for Speech Emotion Recognition," arXiv preprint arXiv:2109.07916, 2021.

Ekman, Paul, "Facial expressions of emotion: an old controversy and new findings," Philosophical Transactions of the Royal Society of London. Series B: Biological Sciences 335, No. 1273: 63-69, 1992.

Engwall, Olov, and Jonas Beskow, "Resynthesis of 3D tongue movements from facial data," In Eighth European Conference on Speech Communication and Technology, 2003.

Ezzat, Tony, Gadi Geiger, and Tomaso Poggio, "Trainable videorealistic speech animation," ACM Transactions on Graphics (TOG) 21, No. 3: 388-398, Jun. 6, 2002.

Fabre, Diandra, Thomas Hueber, Laurent Girin, Xavier Alameda-Pineda, and Pierre Badin, "Automatic animation of an articulatory tongue model from ultrasound images of the vocal tract," Speech Communication 93: 63-75, Sep. 6, 2017.

FFX, FaceFX, URL: https://facefx.com/, Retrieved on: Sep. 3, 2021.

Gidaris, Spyros, Praveer Singh, and Nikos Komodakis, "Unsupervised representation learning by predicting image rotations," arXiv preprint arXiv:1803.07728, Mar. 21, 2018.

(56)           References Cited

OTHER PUBLICATIONS

Hahn, Fabian, Bernhard Thomaszewski, Stelian Coros, Robert W. Sumner, and Markus Gross, "Efficient simulation of secondary motion in rig-space," In Proceedings of the 12th ACM SIGGRAPH/ eurographics symposium on computer animation, pp. 165-171, 2013.

Hahn, Fabian, Sebastian Martin, Bernhard Thomaszewski, Robert Sumner, Stelian Coros, and Markus Gross, "Rig-space physics." ACM transactions on graphics (TOG) 31, No. 4: Jan. 8, 2012.

Han, Kun, Dong Yu, and Ivan Tashev, "Speech emotion recognition using deep neural network and extreme learning machine," In Interspeech, 2014.

Hannun, Awni, Carl Case, Jared Casper, Bryan Catanzaro, Greg Diamos, Erich Elsen, Ryan Prenger et al, "Deep speech: Scaling up end-to-end speech recognition," arXiv preprint arXiv:1412.5567, Dec. 19, 2014.

Higgins, Irina, Loic Matthey, Arka Pal, Christopher Burgess, Xavier Glorot, Matthew Botvinick, Shakir Mohamed, and Alexander Lerchner, "beta-vae: Learning basic visual concepts with a constrained variational framework," In International conference on learning representations, 2017.

Holden, Daniel, Jun Saito, and Taku Komura, "Learning inverse rig mappings by nonlinear regression," IEEE transactions on visualization and computer graphics 23, No. 3: 1167-1178, 2016.

Huang, Xuedong, and Kai-Fu Lee, "On speaker-independent, speaker-dependent, and speaker-adaptive speech recognition," IEEE Transactions on Speech and Audio processing 1, No. 2: 150-157, Apr. 1993.

Jali, Jali Research Inc. 2021, URL: http://jaliresearch.com, Retrieved on: Sep. 3, 2021.

James, Jesin, Li Tian, and Catherine Watson, "An open source emotional speech corpus for human robot interaction applications," Interspeech, Sep. 2, 2018.

Jonell, Patrik, Taras Kucherenko, Gustav Eje Henter, and Jonas Beskow, "Let's face it: Probabilistic multi-modal interlocutor-aware generation of facial gestures in dyadic settings," In Proceedings of the 20th ACM International Conference on Intelligent Virtual Agents, pp. 1-8, Oct. 22, 2020.

Karras, Tero, Miika Aittala, Samuli Laine, Erik Härkönen, Janne Hellsten, Jaakko Lehtinen, and Timo Aila, "Alias-Free Generative Adversarial Networks," arXiv preprint arXiv:2106.12423, Mar. 13, 2021.

Karras, Tero, Samuli Laine, and Timo Aila, "A style-based generator architecture for generative adversarial networks," In Proceedings of the IEEE/CVF conference on computer vision and pattern recognition, pp. 4401-4410, 2019.

Karras, Tero, Samuli Laine, Miika Aittala, Janne Hellsten, Jaakko Lehtinen, and Timo Aila, "Analyzing and Improving the Image Quality of StyleGAN," In 2020 IEEE/CVF Conference on Computer Vision and Pattern Recognition (CVPR), pp. 8107-8116, IEEE Computer Society, 2020.

Karras, Tero, Timo Aila, Samuli Laine, Antti Herva, and Jaakko Lehtinen, "Audio-driven facial animation by joint end-to-end learning of pose and emotion," ACM Transactions on Graphics (TOG) 36, No. 4: Jan. 12, 2017.

Kingma, D. P., and M. Welling, "Auto-encoding variational Bayes. 2nd international conference on learning representations (ICLR2014)," Preprint, submitted Dec. 23 (2014): arXiv: http://arxiv.org/abs/1312. 6114v10, May 1, 2014.

Kingma, Diederik P., and Max Welling, "Auto-encoding variational bayes," arXiv preprint arXiv:1312.6114, Dec. 20, 2013.

Korn, Oliver, Lukas Stamm, and Gerd Moeckl, "Designing authentic emotions for non-human characters: A study evaluating virtual affective behavior," In Proceedings of the 2017 conference on designing interactive systems, pp. 477-487, Jun. 10, 2017.

Lewis, John P., and Ken-Ichi Anjyo, "Direct manipulation blendshapes," IEEE Computer Graphics and Applications 30, No. 4: 42-50, Jul. 2010.

Lewis, John P., Ken Anjyo, Taehyun Rhee, Mengjie Zhang, Frederic H. Pighin, and Zhigang Deng, "Practice and theory of blendshape facial models," Eurographics (State of the Art Reports) 1, No. 8: Feb. 2014.

* cited by examiner

100

Computing System 101

> Gaming Application 102
>
> > Facial Animations 103
> >
> > Speech Audio 104

> Animation Computing System 105
>
> > Speech Emotion Recognition Model 106
> >
> > Facial Animation Generative Model 107
> >
> > Conditioning Inputs 108

> Training System 109
>
> > Speech Animation Training Examples 110
> >
> > Speech Emotion Training Examples 111

800

Generate emotion representations representing emotion of speech audio    8.1

Determine conditioning input for each emotion representation    8.2

Generate facial animation data using the conditioning inputs    8.3

GENERATING EXPRESSIVE FACIAL ANIMATION DATA FROM SPEECH AUDIO USING SPEECH EMOTION RECOGNITION

The provision of facial animations is an important part of video game development. It may be desirable to provide systems and methods for generating facial animations from speech audio wherein the generated facial animations match the speech sounds and speech emotion of the speech audio.

SUMMARY

In accordance with a first aspect, this specification provides a computer-implemented method for generating facial animation data. The facial animation data animates a face in a video game in accordance with speech sounds and speech emotion of speech audio. Speech audio data representing the speech audio is processed using a machine-learned speech emotion recognition model. One or more emotion representations that represent the emotion of the speech audio are generated. For each of the one or more emotion representations, a respective conditioning input for a facial animation generative model is determined. Facial animation data for the speech audio data is generated, comprising processing, using the facial animation generative model: (i) input data derived from the speech audio data, and (ii) the one or more conditioning inputs.

Each of the one or more emotion representations may comprise one or more emotion classifications. Each of the one or more conditioning inputs may be determined using a set of pre-determined conditioning inputs. Each conditioning input of the set of pre-determined conditioning inputs may be associated with a respective emotion classification from a set of emotion classifications. Generating the one or more emotion representations that represent the emotion of the speech audio may comprise, for each emotion representation, generating a respective score for each emotion classification of the set of emotion classifications.

Determining, for each of the one or more emotion representations, the respective conditioning input for the facial animation generative model may comprise: for each of the one or more emotion classifications, weighting the associated pre-determined conditioning input based on the respective score; and summing together the weighted pre-determined conditioning inputs to generate the respective conditioning input for the facial animation generative model.

Determining, for each of the one or more emotion representations, the respective conditioning input for the facial animation generative model may comprise selecting the pre-determined conditioning input associated with a highest-scoring emotion classification.

Generating the one or more emotion representations may comprise generating a global emotion representation that represents the emotion of the entire speech audio. Determining, for each of the one or more emotion representations, the respective conditioning input may comprise determining a global conditioning input for the entire speech audio.

Generating the one or more emotion representations may comprise generating an emotion representation for each time step of a plurality of time steps of the speech audio data. This may comprise processing speech audio data of the time step using the machine-learned speech emotion recognition model. Determining, for each of the one or more emotion representations, the respective conditioning input may comprise determining a conditioning input for each time step using the emotion representation generated for the time step.

Generating the facial animation data for the speech audio data may comprise generating, for each time step of a plurality of time steps of the speech audio data, mesh data for a facial mesh.

Generating the facial animation data for the speech audio data may comprise generating, for each time step of a plurality of time steps of the speech audio data, rig parameters for a facial animation rig.

The facial animation generative model may comprise at least one of: a decoder of a conditional variational autoencoder; a generator neural network of a conditional generative adversarial neural network; a conditional flow-based model, which is optionally a conditional normalizing flow model; and a conditional denoising diffusion model.

In accordance with a second aspect, this specification provides a computing system for generating facial animation data. The facial animation data animates a face in a video game in accordance with speech sounds and emotion of speech audio. The computing system comprises one or more computing devices configured to: generate one or more emotion representations that represent the emotion of the speech audio, comprising processing, using a machine-learned speech emotion recognition model, speech audio data representing the speech audio; determine, for each of the one or more emotion representations, a respective conditioning input for a facial animation generative model; and generate facial animation data for the speech audio data, comprising processing, using the facial animation generative model: (i) input data derived from the speech audio, and (ii) the one or more conditioning inputs.

The input data derived from the speech audio data may comprise acoustic features for each time step of a plurality of time steps of the speech audio data. The acoustic features may comprise spectrogram parameters.

The input data derived from the speech audio data may comprise outputs generated by one or more neural network layers of a speech transcription neural network, wherein the outputs are generated by processing the speech audio data using the speech transcription neural network.

The facial animation generative model may comprise at least one of: a decoder of a conditional variational autoencoder; a generator neural network of a conditional generative adversarial neural network; a conditional flow-based model, which is optionally a conditional normalizing flow model; and a conditional denoising diffusion model.

In accordance with a third aspect, this specification provides a non-transitory computer-readable medium storing instructions, which when executed by one or more processors, cause the processor to: generate one or more emotion representations for speech audio, comprising processing, using a machine-learned speech emotion recognition model, speech audio data representing the speech audio; determine, for each of the one or more emotion representations, a respective conditioning input for a facial animation generative model; and generate facial animation data for the speech audio data, comprising processing, using the facial animation generative model: (i) input data derived from the speech audio, and (ii) the one or more conditioning inputs.

The input data derived from the speech audio data may comprise acoustic features for each time step of a plurality of time steps of the speech audio data. The acoustic features may comprise spectrogram parameters.

The input data derived from the speech audio data may comprise outputs generated by one or more neural network layers of a speech transcription neural network, wherein the outputs are generated by processing the speech audio data using the speech transcription neural network.

The facial animation generative model may comprise at least one of: a decoder of a conditional variational autoencoder; a generator neural network of a conditional generative adversarial neural network; a conditional flow-based model, which is optionally a conditional normalizing flow model; and a conditional denoising diffusion model.

DESCRIPTION

General Definitions

Figure 1:
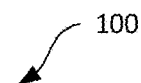
FIG. 1 is a schematic block diagram illustrating an example of a computing system configured to generate a facial animation generative model.

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "video game", as used in some embodiments described herein, is a virtual interactive environment in which players engage. Video game environments may be facilitated through a client-server framework in which a client may connect with the server to access at least some of the content and functionality of the video game.

"Speech" as used in some embodiments described herein may include sounds in the form of spoken words in any language, whether real or invented and/or other utterances including paralinguistics such as sighs, yawns, moans etc. "Speech audio" refers to audio (e.g. audio data) which includes or represents speech, and may comprise data in any suitable audio file format whether in a compressed or uncompressed format.

"Acoustic features" as used in some embodiments described herein may include any suitable acoustic representation of frequency, magnitude and/or phase information of speech audio. For example, acoustic features may comprise linear spectrograms, log-mel-spectrograms, linear predictive coding (LPC) coefficients, Mel-Frequency Cepstral Coefficients (MFCC), Spectral Subband Centroids (SSC), log fundamental frequency (LFO), band aperiodicity (bap) or combinations thereof.

"Text" as used in some embodiments described herein refers to any suitable representation of characters, words or symbols that may be used to represent language and/or speech.

A "mesh", as used in some embodiments described herein, is a collection of vertices and/or edges and/or other elements that describes the shape of an object, or part of an object, in a video game. A mesh may be a polygon mesh, such as a triangle mesh, wherein vertices are arranged in polygons to form the surface of the shape.

"Mesh data", as used in some embodiments described herein is data defining a configuration (e.g. the 3D shape) of at least part of a mesh. Mesh data may for example specify the position of elements of the mesh such as vertices and/or edges. In some examples, mesh data may define the configuration (e.g. shape) of a mesh by specifying a deformation or transformation from a default/neutral mesh configuration.

"Rigging", as used in some embodiments described herein, is a technique that provides controls for animating a video game object. An animation rig (also referred to herein as simply a "rig") may be provided which defines the logic (e.g. a set of rules) by which the controls (also referred to herein as "rig parameters") are transformed into mesh data for the video game object. A rig may be skeletal-based, wherein the controls define the configuration (e.g. rotation) of various joints of a skeleton, and the mesh is generated/deformed based on the configuration of the joints. Additionally or alternatively, the rig may be based on blend shapes (or any other suitable set of basis shapes) that define modifications of the mesh (e.g. from a default/neutral configuration of the mesh), wherein the controls define how different blend shapes are combined. A weight may be determined for each of the blend shapes from the controls, and the mesh may be generated using the blend shapes and their respective weights.

This specification describes systems and methods for generating facial animation data that animate a face in a video game in accordance with speech sounds and speech emotion of speech audio. In particular, the systems and methods described herein determine conditioning inputs for a facial animation generative model using a machine-learned speech emotion recognition model that extracts representations of the speech emotion of the speech audio. The determined conditioning inputs and the speech audio (or data derived therefrom) are used to condition the facial animation generative model (e.g. by application as inputs), and facial animation data is generated in accordance with the speech sounds and speech emotion of the speech audio.

In this way, the movement of speech articulators (e.g. lips, tongue, jaws, etc.) and the facial expressions displayed in facial animations driven by the facial animation data can match the speech sounds and speech emotion of the speech audio in a realistic and accurate manner. Furthermore, by using the speech emotion recognition model, the conditioning inputs for the speech audio can be determined in an automated manner without requiring manual selection of conditioning inputs, but still allowing manual editing.

The described systems and methods can be used to provide a "global" conditioning input for the entire speech audio and/or provide a conditioning input for each time step of a plurality of time steps of the speech audio. For example, to determine a global conditioning input, the speech emotion recognition model may process speech audio data and generate a global emotion representation representing an overall speech emotion for the entire speech audio. By using a global conditioning input to condition the facial animation generative model, the facial expression of generated facial animations may match the overall tone/speech emotion of the speech audio. To determine a conditioning input for each time step of a plurality of time steps, the speech emotion recognition model may process speech audio data associated with a time step and generate an emotion representation representing the emotion of the speech audio associated with the time step. Conditioning the facial animation generative model using these conditioning inputs may allow the facial expression of generated facial animations to vary over the duration of the speech audio while still realistically matching the speech emotion of the various time steps.

The conditioning inputs may comprise latent vectors of a learned latent space. For example, a distribution of a latent space may be learned when training the facial animation generative model to generate facial animation data (e.g. face poses) from speech audio. In general, the facial animation generative model comprises a conditional generative model that, during training, learns a mapping from a latent space to a space of face poses, conditioned on speech audio. For example, by conditioning on speech audio (such as short windows of speech audio), the latent space may be learned to represent variations in face poses that are independent of (or are largely decoupled from) variations due to speech sounds. In this way, latent vectors in the learned latent space can be used to represent different facial expressions corresponding to different speech emotions. Furthermore, latent vectors in the learned latent space can be interpolated between or otherwise modified, and fine-grained facial expressions for (potentially complex) speech emotions can be generated. After training the facial animation generative model, latent vectors corresponding to particular facial expressions/speech emotions (e.g. neutral, happy, sad, angry, etc.) may be identified and stored as conditioning inputs for use in generating facial animations.

FIG. 1 is a schematic block diagram illustrating an example 100 of a computing system 101 configured to generate a facial animation generative model 107. The facial animation generative model 107 receives speech audio data representing speech audio 104 (or data derived therefrom) and one or more conditioning inputs 108, and generates facial animation data for animating a face in a video game. The one or more conditioning inputs 108 are determined using speech emotion recognition model 106 which processes the speech audio data and extracts representations of the speech emotion of the speech audio 104. Any of the functionality described as being performed by a specific component of the system 101 may instead be performed across a number of components, and/or functionality described as being performed by multiple components may be performed on a single component.

The computing system 101 includes gaming application 102 configured to provide a video game. Gaming application 102 includes a game engine (not displayed). The game engine can be configured to execute aspects of the operation of the gaming application 102 according to game rules. Examples of game rules can include rules for scoring, possible inputs, actions/events, movement in response to inputs, and the like. The game engine may receive inputs (provided by a user and/or by other components of the system 101) and determine in-game events, such as actions, jumps, runs, throws, attacks, and other events appropriate for the gaming application 102. During runtime operation, the game engine can read user inputs, in-game data, and game state information to determine the appropriate in-game events. This can include causing one or more facial animations 103 stored as part of the gaming application 102 to be rendered and displayed, along with causing output of corresponding speech audio 104 for the one or more facial animations 103.

Facial animations 103 provide a sequence of video frames displaying a face for the video game. The facial animations 103 may be stored in any appropriate format. For example, the facial animations 103 may be stored as mesh data, texture data, pixel data, and/or compressed representations thereof. Mesh data may specify the positions of a collection of vertices in a 3D space, representing the shape of a face (e.g. the face pose) by a facial mesh. Texture data may specify the surface appearance of a face that may be represented by a mesh. Texture data may be stored in the form of an image. Pixel data may specify color and/or light intensity values for each pixel of a video frame that is rendered for display by the gaming application 102. Additionally or alternatively, rig parameters for a facial animation rig may be used to store the facial animations 103.

Speech audio 104 provides a sequence of speech audio frames for outputting speech in the video game. The speech audio 104 may be stored in any appropriate format, e.g. as a waveform and/or in a compressed format, etc. At least some speech audio 104 (e.g. one or more stored speech audio files) is associated with a respective facial animation 103 in that the gaming application 102 causes the speech audio 104 to be outputted together with display of the associated facial animation 103 at some point in playthrough of the video game.

The computing system 101 includes an animation system 105 that is used/accessed by animators to produce facial animations 103 for the gaming application 102. The animation system 105 typically includes an animation application (not displayed) that provides a graphical user interface for animators to interact with when producing facial animations 103 for speech audio 104.

The animation computing system 105 includes a speech emotion recognition model 106, a facial animation generative model 107, and conditioning inputs 108.

The speech emotion recognition model 106 is configured to receive speech audio data representing speech audio 104. The speech audio data may comprise a waveform of speech audio 104. Additionally or alternatively, the speech audio data may comprise a compressed representation of the speech audio. For example, the speech audio data may comprise acoustic features comprising a representation of frequency, magnitude and/or phase information of the speech audio 104 such as linear spectrograms, log-mel-spectrograms, linear predictive coding (LPC) coefficients, Mel-Frequency Cepstral Coefficients (MFCC), Spectral Subband Centroids (SSC) log fundamental frequency (LFO), band aperiodicity (bap) or combinations thereof. The speech audio data may comprise a plurality of time steps and associated data for each time step, e.g. acoustic features and/or amplitudes for each of the plurality of time steps.

The speech emotion recognition model 106 is configured to process the speech audio data and generate one or more emotion representations representing the speech emotion of the speech audio data. The speech emotion recognition model 106 may generate a "global" emotion representation that represents the overall speech emotion of the speech audio 104. Additionally or alternatively, the speech emotion recognition model 106 may generate an emotion representation for each time step of a plurality of time steps of the speech audio data. The emotion representation for a time step represents the speech emotion of the speech audio 104 for the particular time step. An emotion representation may comprise any suitable representation of speech emotion. For example, an emotion representation may comprise one or more emotion classifications such as "Happy", "Sad", "Angry", "Neutral", etc. These emotion representations may further comprise a score/probability for each emotion classification in a set of emotion classifications, e.g.: "'Happy': 80%, 'Sad': 0%, 'Angry': 15%, 'Neutral': 5%". Additionally or alternatively, an emotion representation may comprise arousal and/or valence values which may have positive or negative values. Additionally or alternatively, an emotion representation may comprise an embedding/encoding produced by the speech emotion recognition model 106 (e.g. as output generated by one or more neural network layers preceding an output layer of the speech emotion recognition model 106).

The speech emotion recognition model 106 may comprise a machine-learned model that has been trained to predict speech emotion from speech audio data. For example, the speech emotion recognition model 106 may comprise a neural network comprising a plurality of neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network may comprise one or more Transformer encoder and/or decoder blocks. An example machine-learned speech emotion recognition model is described in greater detail in relation to FIG. 4. The speech emotion recognition model 106 is trained using training system 109 and speech emotion training examples 111. Training of a machine-learned speech emotion recognition model 106 is described in greater detail in relation to FIG. 5.

The animation computing system 105 is configured to determine a respective conditioning input 108 for each of the one or more emotion representations. The conditioning inputs 108 are used to condition the facial animation generative model 107 to generate facial animation data in accordance with the speech emotion of the speech audio 104. As will be described in relation to FIG. 6, the conditioning inputs 108 may be determined using a set of predetermined conditioning inputs. For example, the animation computing system 105 may be configured to store conditioning inputs that have been determined to correspond to particular facial expressions when applied as input to the facial animation generative model 107. Additionally or alternatively, and as will be described in relation to FIG. 7, the speech emotion recognition model 106 may generate predicted speech emotions that may be directly used as conditioning inputs 108 for the facial animation generative model 107.

The facial animation generative model 107 is configured to receive the speech audio data (or data derived therefrom) and the one or more conditioning inputs 108, and generate facial animation data. The speech audio data may comprise a plurality of time steps and associated data for each time step. For example, the speech audio data may comprise acoustic features and/or amplitudes for each of the plurality of time steps.

Speech audio data may be processed prior to being received by the facial animation generative model 107. For example, a speech processing neural network may first process the speech audio data. Outputs generated by one or more neural network layers of the speech processing neural network from processing the speech audio data may be received by the facial animation generative model 107. The speech processing neural network may be a pre-trained speech recognition model such as a speech transcription neural network that has been trained to predict the speech content of speech audio. This can be used to provide representations that represent aspects of both the speech sounds and the speech content of the speech audio. For example, outputs generated by an intermediate neural network layer (e.g. a neural network layer preceding an output layer) of the speech transcription neural network may be provided to the facial animation generative model 107. Additionally or alternatively, outputs generated by an output layer of the speech transcription neural network can be provided to the facial animation generative model 107. Outputs can be generated by one or more neural network layers of the speech processing neural network for each time step of the speech audio data, and the outputs of each time step can be provided to the facial animation generative model 107.

The facial animation generative model 107 comprises a generative machine-learned model that has been trained to generate facial animation data from speech audio data. The facial animation generative model 107 is trained using training system 109 and speech animation training examples 110. The facial animation generative model 107 may comprise a neural network comprising a plurality of neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network may comprise one or more Transformer encoder and/or decoder blocks.

Figure 2:
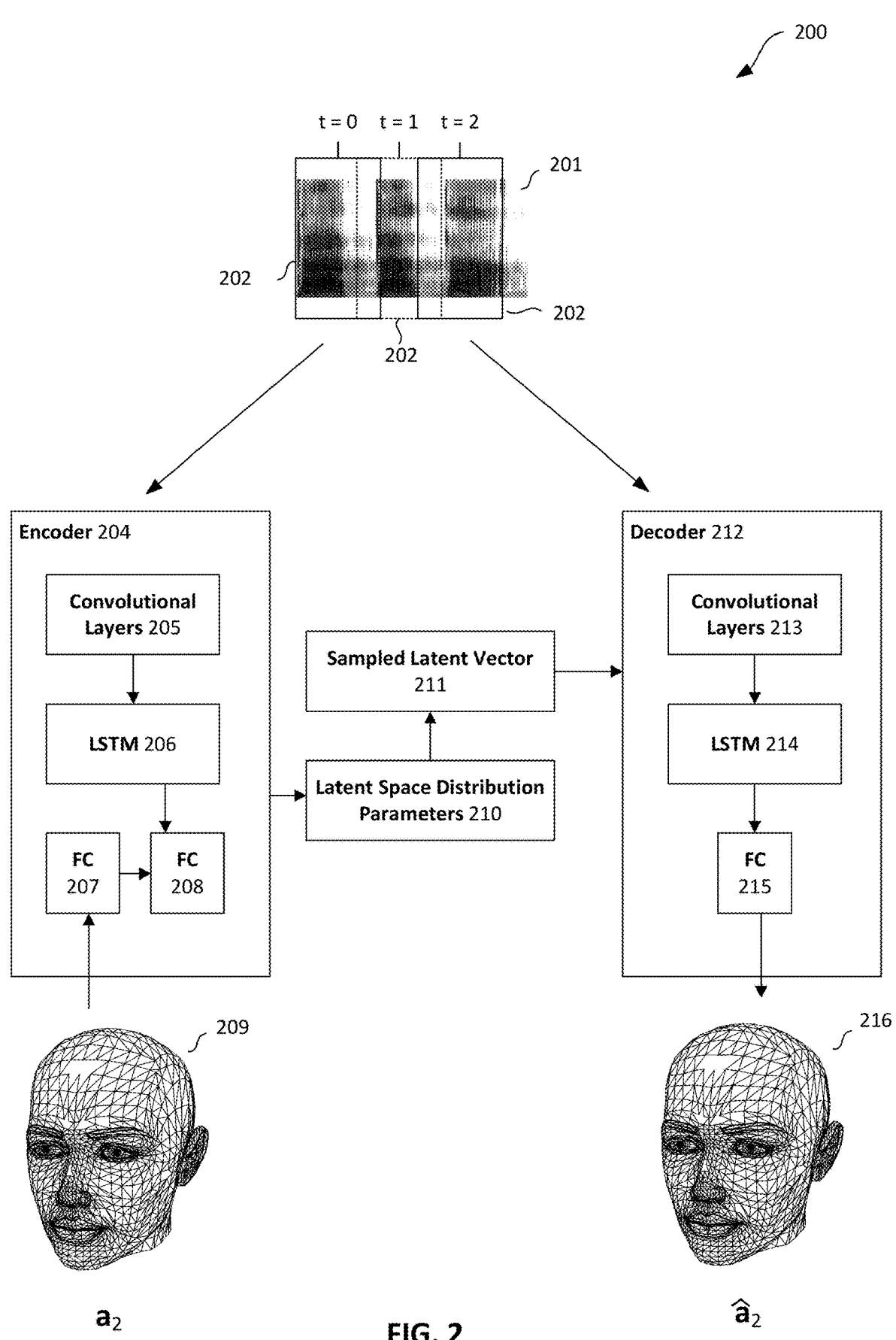
FIG. 2 illustrates an example method for training a conditional variational autoencoder to generate a trained facial animation generative model.

The facial animation generative model 107 may comprise any suitable conditional generative model. For example, the facial animation generative model 107 may comprise one or more of: a decoder of a conditional variational autoencoder; a generator neural network of a conditional generative adversarial neural network; a conditional flow-based model, which is optionally a conditional normalizing flow model; and a conditional denoising diffusion model. Turning to FIG. 2, an example method for training a conditional variational autoencoder to generate a facial animation generative model 107 is described.

FIG. 2 illustrates an example method 200 for training a conditional variational autoencoder (cVAE) to generate a trained facial animation generative model. The conditional variational autoencoder comprises an encoder 204 and a decoder 212. After training of the cVAE is completed, the decoder 212 can be used to provide a trained facial animation generative model.

During training, a number of training examples are received. Each training example may comprise speech audio data 201 and an animation frame of ground-truth facial animation data 209. In the example method 200 illustrated in FIG. 2, the speech audio data 201 comprises acoustic features for each of a plurality of audio frames 202, and the ground-truth facial animation data 209 for an animation frame comprises mesh data for a facial mesh. The acoustic features for an audio frame 202 for a time step t may be provided as a matrix $S_t$ representing a speech window centered at the audio frame. For example, $S_t$ may be a matrix of size F×B representing B bins of F acoustic features centered at frame t. The speech windows of adjacent audio frames may overlap with each other, as illustrated in FIG. 2. The mesh data for an animation frame $a_t$ may be provided as a vector of mesh vertex coordinates. For example, $a_t$ may be a vector of size 3V representing three-dimensional coordinates for V vertices.

The one or more convolutional layers 205 of the encoder 204 receive acoustic features for a sequence of audio frames 202. In the example illustrated in FIG. 2, the cVAE is being trained to reconstruct facial animation data $a_2$ for an animation frame using a sequence of acoustic features from three audio frames. In general, acoustic frames from a sequence of three audio frames may be processed to reconstruct facial animation data at for a $t^{th}$ animation frame. However, it will be appreciated that acoustic features from a fewer number or a greater number of audio frames 202 may be used to reconstruct facial animation data 209 for animation frames.

The output of the one or more convolutional layers 205 is received by LSTM layers 206. LSTM layers 206 can be used to aggregate temporal information from the sequence of processed speech and may enable temporally stable facial animations to be generated.

The ground-truth facial animation data 209 for an animation frame is received by fully connected layers 207 of the encoder 204. The fully connected layers 207 process the facial animation data 209 to generate a representation of a face pose. The representation of the face pose output by fully connected layers 207 is combined with the output of LSTM layers 206 (e.g. by concatenation) and the combined outputs are processed by fully connected layers 208. In this way, the output of fully connected layer 208 can be used to provide a low-dimensional representation of the face pose that is decoupled from the speech of the sequence of acoustic features.

The output of fully connected layers 208 comprises latent space distribution parameters 210. cVAEs assume the existence of a latent variable that encodes speech-agnostic variation in facial poses, thus learning a latent distribution that represents the space of plausible face poses given speech. The latent space distribution parameters represent parameters for the distribution of the latent space. For example, the latent space distribution parameters 210 may comprise statistics (e.g. means, variances, covariances, standard deviations, etc.) for a multivariate isotropic Gaussian distribution that can model the latent space.

A latent vector 211 is sampled using the latent space distribution parameters 210. This may comprise generating a vector with elements sampled from a standard multivariate normal distribution (i.e. a Gaussian distribution with zero mean and unit variance), and transforming the vector using the latent space distribution parameters 210 to generate the sampled latent vector 211. The sampled latent vector 211 represents a particular plausible face pose given the sequence of acoustic features.

The sampled latent vector 211 is received at one or more convolutional layers 213 of the decoder 212. The one or more convolutional layers 213 also receive acoustic features for the sequence of audio frames 202. The output of the one or more convolutional layers 213 is received by LSTM layers 214. LSTM layers 214 can be used to aggregate temporal information from the sequence of processed speech and may enable temporally stable facial animations to be generated.

The output of LSTM layers 214 is received by fully connected layers 215. The fully connected layers 215 operate on its received input to generate reconstructed mesh data 216 for the facial mesh. The reconstructed mesh data 216 is for the same animation frame as the animation frame of the mesh data 209 received as input to the encoder 204. The reconstructed mesh data 216 may be a vector having the same shape as the vector representing the input mesh data 209.

A loss is calculated based on the mesh data 209 for the training example and the reconstructed mesh data 216. For example, the loss may comprise one or more reconstruction losses (e.g. a log-likelihood loss) which aims to minimize differences between the reconstructed mesh data 216 and the input mesh data 209. The loss may comprise one or more divergences (e.g. a Kullback-Liebler divergence) which aims to constrain the latent space distribution determined by the encoder to a selected prior distribution (e.g. a standard multivariate Gaussian distribution). The parameters of the encoder 204 and decoder 212 are updated based on the loss using a suitable optimization procedure. For example, gradient-based methods such as gradient descent may be used to minimize the loss, and backpropagation may be used to determine parameter updates for the various neural network layers. cVAEs and their training are described in greater detail in U.S. patent application Ser. No. 16/394,515 (issued as U.S. Pat. No. 11,049,308), the entirety of which is incorporated herein by reference.

After training of the cVAE, conditioning inputs in the form of latent vectors corresponding to particular speech styles/emotions can be determined. For example, different latent vectors can be provided to the trained decoder 212 to determine the effect of the latent vector on the resulting facial animation. As an example, if inputting a particular latent vector with any speech audio clip to trained decoder 212 generally causes the resulting facial animations to portray a happy expression, the particular latent vector may be stored and associated with an indication of "happy" as a speech emotion. The particular latent vector that has been stored can subsequently be provided as a conditioning input to the trained decoder 212 for generating facial animations with a happy expression.

In this way, conditioning inputs comprising latent vectors corresponding to various speech styles/emotions (e.g. happy, angry, sad, neutral) can be identified. A database in the form of a latent codebook, which identifies particular latent vectors with associated speech styles/emotions may thus be developed.

Figure 3:
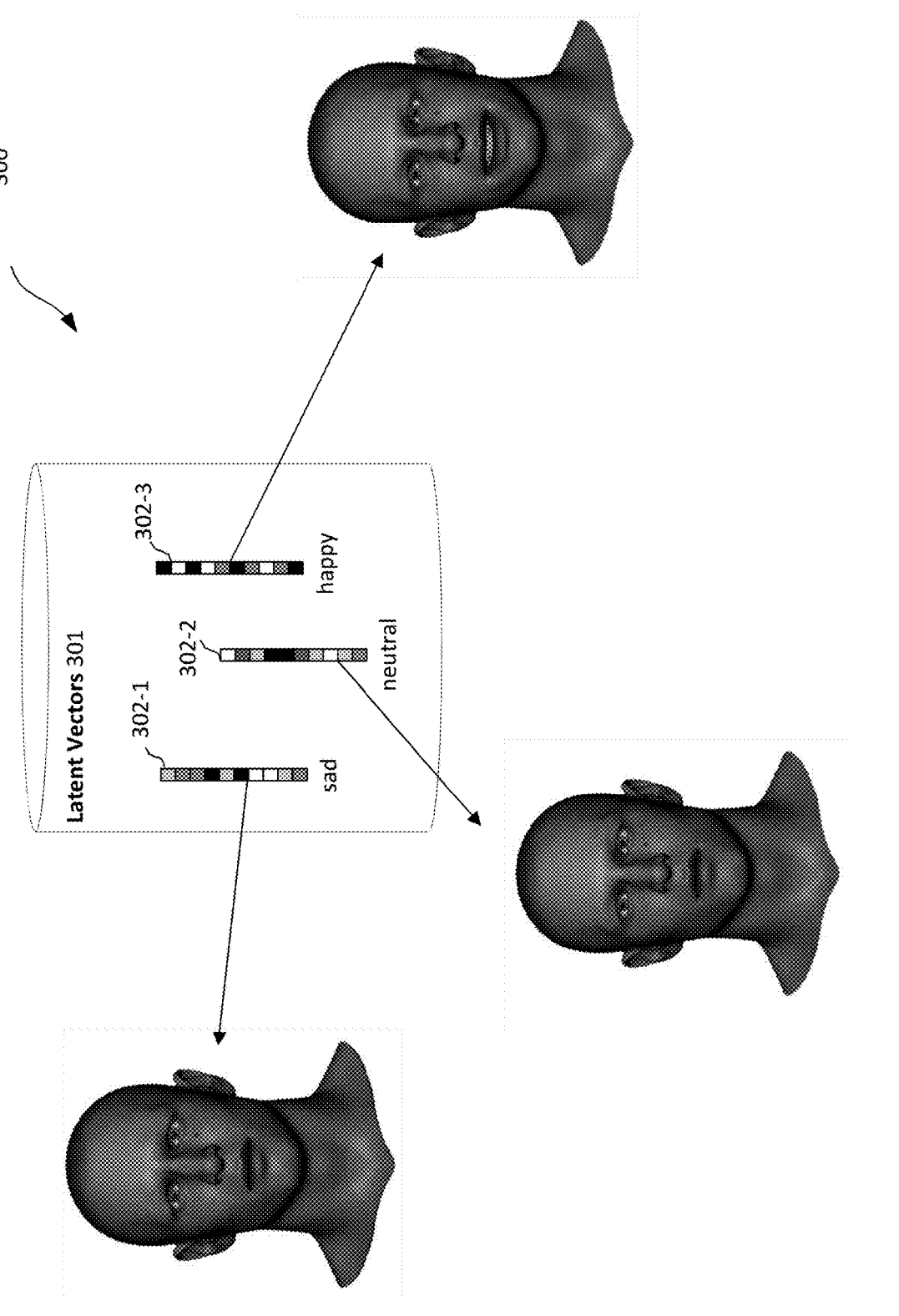
FIG. 3 illustrates example conditioning inputs for use in conditioning a facial animation generative model.

FIG. 3 schematically illustrates an example latent codebook 300 comprising latent vectors 301 for use in conditioning a facial animation generative model. The set of latent vectors 301 may comprise latent vector 302-1 corresponding to a sad speech emotion, latent vector 302-2 corresponding to a neural speech emotion, and latent vector 302-3 corresponding to a happy speech emotion. FIG. 3 also displays the respective effects in the resulting facial animation when applying each latent vector 302 as a conditioning input to the facial animation generative model. The set of latent vectors can be determined in any appropriate manner, e.g. by latent optimization using reference speech animations associated with a particular speech style/emotion, by investigating the effects in resulting facial animations using randomly generated latent vectors, etc.

Figure 4:
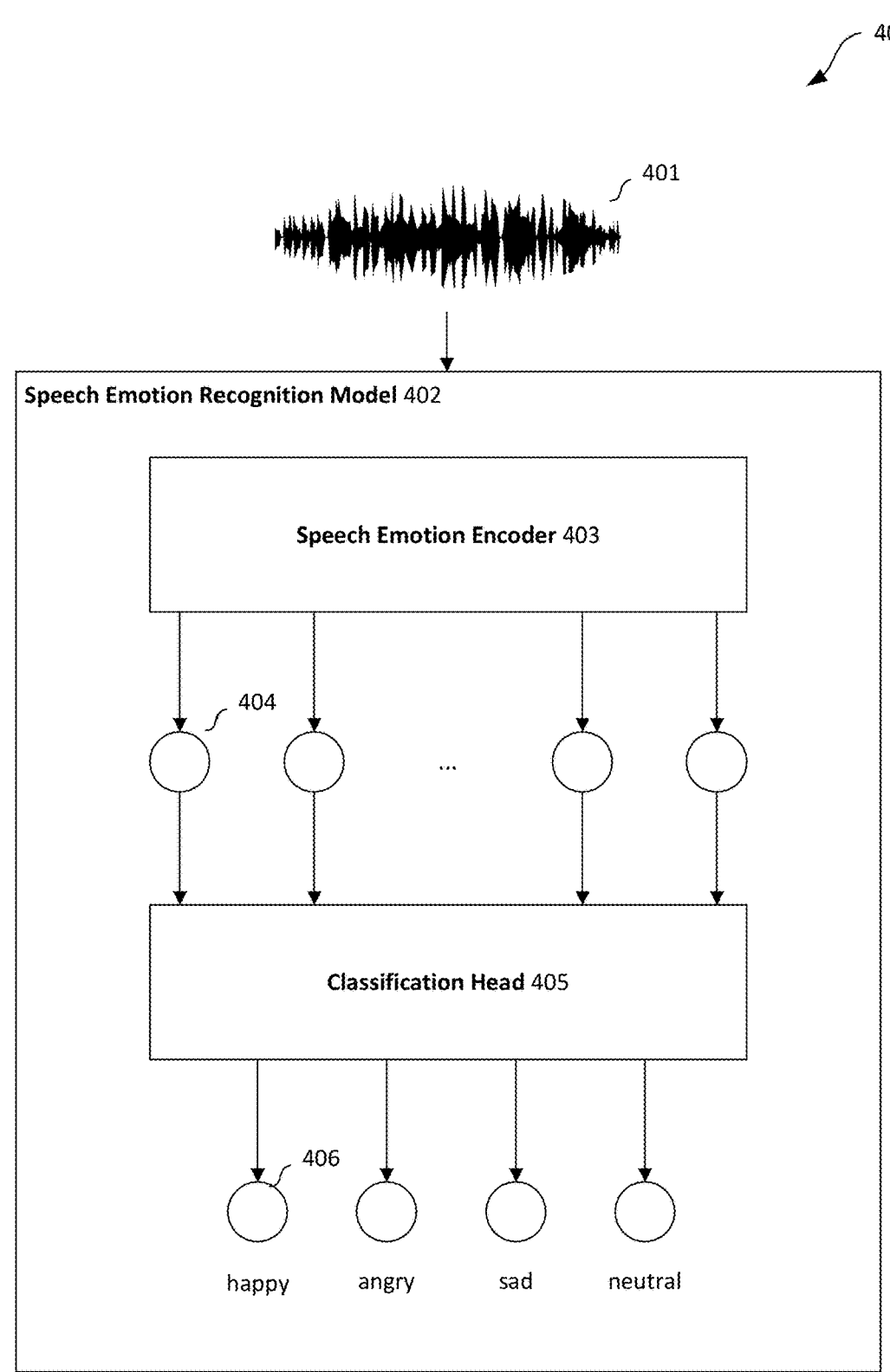
FIG. 4 illustrates an example method for using a machine-learned speech emotion recognition model to determine a conditioning input comprising latent vectors.

FIG. 4 illustrates an example method 400 for using a speech emotion recognition model 402 to determine a conditioning input comprising latent vectors which reflects the speech style/emotion of received speech audio. As described in more detail below, the determined latent vector may be used to generate facial animations that match both the speech sounds and speech emotion of the speech audio.

The speech emotion recognition model 402 receives speech audio data 401 representing speech audio as input. The speech audio data 402 may be in the form of a waveform (e.g. amplitudes) and/or in the form of acoustic features. The speech audio data 401 may comprise data for each time step of a plurality of time steps.

The speech emotion recognition model 402 comprises a speech emotion encoder 403, which generates speech emotion embeddings 404, and a classification head 405, which generates an output 406 for each emotion classification in a set of emotion classifications.

The speech emotion encoder 403 comprises one or more neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the speech emotion encoder 403 may comprise one or more Transformer encoder and/or decoder blocks. In some implementations, the speech emotion encoder 403 comprises a portion of a pre-trained speech recognition neural network.

The speech emotion encoder 403 receives the speech audio data. The speech emotion encoder 403 operates on its received inputs and generates a speech emotion encoding/embedding 404. The generated speech emotion encoding/embeddings 404 may be used to form an emotion representation for the speech audio data 401. The speech emotion encoder 403 may generate a speech emotion encoding/embedding 404 for each time step of the plurality of time steps of the speech audio data 401.

The classification head 405 comprises one or more neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the classification head 405 may comprise one or more Transformer encoder and/or decoder blocks. The classification head 405 comprises one or more classification layers, e.g. a softmax layer configured to generate a classification for the speech emotion of the speech audio data 401.

The classification head 405 receives the speech emotion encodings/embeddings 404. The classification head 405 operates on its received inputs and generates an output 406 for each emotion classification in a set of emotion classifications. In the example shown in FIG. 4, the set of emotion classifications include "happy", "angry", "sad", "neutral". The output 406 for each emotion classification may comprise a score/probability for the emotion classification, with higher scores/probability for a particular emotion classification representing a higher likelihood that the speech emotion of the speech audio reflects that particular emotion classification. The generated outputs 406 may be used to form an emotion representation for the speech audio data 401. Outputs 406 may be generated once, e.g. for the entire speech audio data 401, or may be generated at each time step of a plurality of time steps.

The outputs 406 can be used to determine conditioning inputs comprising latent vectors for a facial animation generative model. Appropriate latent vectors may be determined using latent codebooks such as the latent codebook 300 described in relation to FIG. 3. For example, if the output 406 for the "happy" emotion classification was greater than the other outputs, a latent vector associated with the "happy" speech emotion may be retrieved from the latent codebook and provided as a conditioning input to the facial animation generative model.

As another example, latent vectors may be combined based on the associated outputs. For example, if the outputs 406 indicated a 70% probability for the "happy" emotion classification, and a 30% probability for the "sad emotion classification, a conditioning input formed from a combination of latent vectors of a latent codebook may be determined as follows. A latent vector for the "happy" emotion classification may be retrieved from the latent codebook and weighted by 0.7 (e.g. by performing elementwise multiplication). Similarly, a latent vector for the "sad" emotion classification may be retrieved from the latent codebook and weighted by 0.3. The two weighted latent vectors may be summed together to determine a conditioning input for the facial animation generative model.

Additionally or alternatively, instead of using a latent codebook, the outputs 406 themselves may be used to form a conditioning input, as described in more detail below with reference to FIG. 7. For example, outputs 406 comprising a score/probability for each of the emotion classifications may form a conditioning input. As another example, a highest scoring emotion classification may be determined using the outputs 406, and an indication of the highest scoring emotion classification may form a conditioning input.

Figure 5:
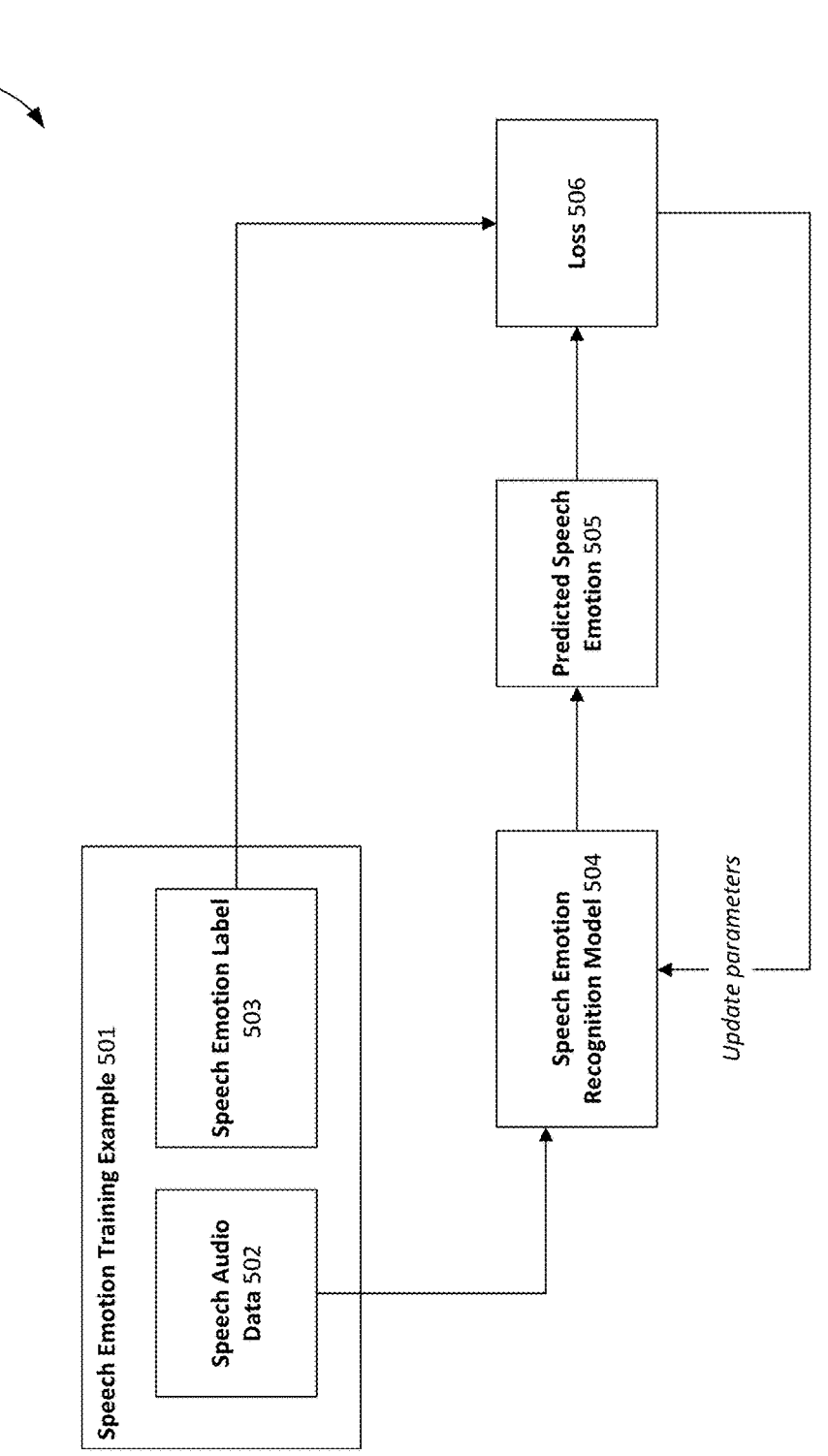
FIG. 5 illustrates an example method for training a speech emotion recognition model.

FIG. 5 illustrates an example method 500 for training a speech emotion recognition model 504. For illustrative purposes, the Figure illustrates training using a single speech emotion training example 501, however it will be appreciated that multiple training examples 501 may be processed at the same time for training the speech emotion recognition model 504 (e.g. using batch processing of a batch of training examples 501).

During training, speech emotion training examples 501 are received. Each speech emotion training example 501 comprises speech audio data 502 and a corresponding ground-truth speech emotion label 503. The speech audio data 502 may comprise any appropriate representation of speech audio. For example, the speech audio data 502 may comprise a waveform of speech audio, compressed representations of speech audio (e.g. acoustic features for speech audio), etc. The speech emotion label 503 may be any suitable label that represents the speech emotion of speech audio represented by the speech audio data 502. For example, the speech emotion label 503 may comprise a one-hot vector corresponding to a particular speech emotion (e.g. happy, sad, angry, etc.). As another example, the speech emotion label 503 may comprise a vector of continuous values, e.g. arousal and valence values. The speech emotion label 503 may comprise a sequence of vectors. For example, the speech audio data 502 may comprise data for each time step of a plurality of time steps and the speech emotion label may comprise a vector for each time step. Speech emotion labels 503 for speech emotion training examples 501 may be provided by manual annotation.

The speech emotion recognition model 504 processes the speech audio data 502 of the speech emotion training example 501 and generates a predicted speech emotion 505. The speech emotion recognition model 504 may comprise a neural network comprising a plurality of neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network may comprise one or more Transformer encoder and/or decoder blocks. The speech emotion recognition model 504 may have the same structure as the speech emotion recognition model 402 illustrated in FIG. 4.

The predicted speech emotion 505 may be represented in a form similar to the speech emotion label 503. For example, the predicted speech emotion 505 may comprise a vector with an equal size to a vector used to form the speech emotion label 503. As another example, the predicted speech emotion 505 may comprise a sequence of vectors with an equal length to a sequence of vectors used to form the speech emotion label 503.

A loss 506 is calculated in dependence on the ground-truth speech emotion label 503 and the predicted speech emotion 505. The loss 506 compares the ground-truth speech emotion label 503 and the predicted speech emotion 505 and provides a training signal for training the speech emotion recognition model 504. The goal for training is to update parameters of the speech emotion recognition model 504 to accurately predict the speech emotion of speech audio data 504 by minimizing differences between the predicted speech emotion 505 and ground-truth speech emotion label 503. The loss 506 may comprise any suitable losses/errors e.g. cross-entropy losses, logistic losses, log-likelihoods, mean squared errors, mean absolute errors, etc. The loss 506 may further comprise regularization terms e.g. L1 regularization terms, L2 regularization terms, etc.

An optimization procedure is used to minimize the loss. For example, the optimization procedure may use gradient-based methods such as stochastic gradient descent, mini-batch gradient descent, or batch gradient descent, including momentum-based methods such as Adam, RMSProp, and AdaGrad. Backpropagation of the loss 506 may be performed to determine parameter updates for the speech emotion recognition model 504. In some implementations, parameter updates may be determined and applied for only a portion of the speech emotion recognition model 504. For example, parameters updates may be determined and applied for only a classification head of the speech emotion recognition model 504.

Training of the speech emotion recognition model 504 may be terminated based on any suitable termination criteria. For example, training may be terminated after completion of a certain number of training iterations that each determine parameter updates and apply the updated parameters to the speech emotion recognition model 504. Additionally or alternatively, training may be terminated based on performance of the speech emotion recognition model 504 on a validation training set of validation training examples. The validation set may comprise speech emotion examples that are separate to the speech emotion training examples 501. Performance of the speech emotion recognition model 504 may be measured using any appropriate metric, e.g. validation accuracy, validation loss etc. Training may be terminated based on a determination that the performance of the speech emotion recognition model 504 exceeds a certain threshold.

After training is terminated, the trained speech emotion recognition model 504 can be used to predict the speech emotion of new examples of speech audio. Emotion representations generated by the trained speech emotion recognition model 504 (e.g. in the form of predicted speech emotions 505 and/or in the form of an intermediate output) can be used to determine a conditioning input for a facial animation generative model, as described in relation to FIG. 4 for example.

Figure 6:
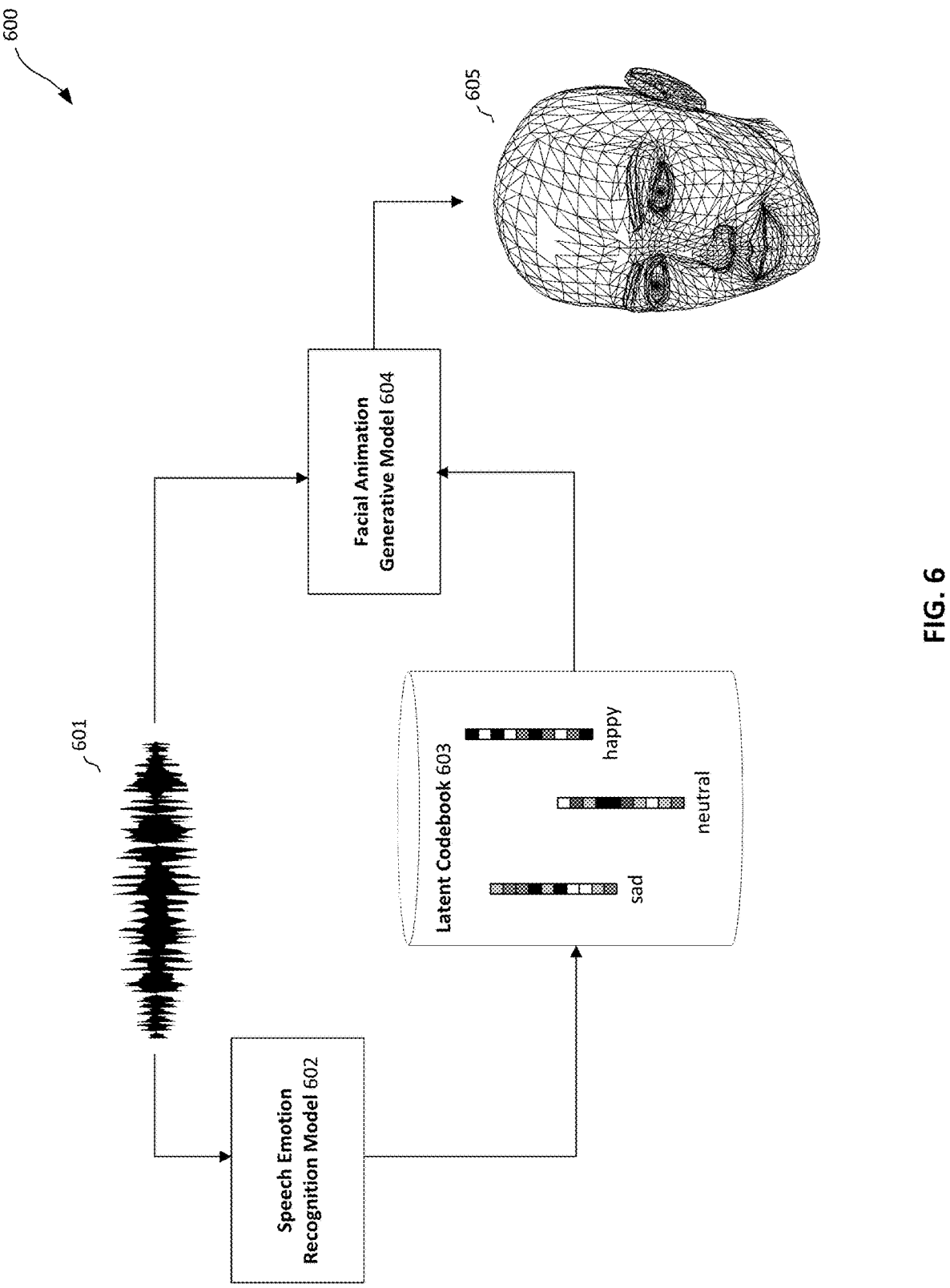
FIG. 6 illustrates an example method for generating facial animation data using a facial animation generative model.

FIG. 6 illustrates an example method 600 for generating facial animation data 605 using a facial animation generative model 604. For illustrative purposes, the facial animation data 605 is illustrated as a facial mesh representing a facial pose however it will be appreciated that facial animation data 605 may be provided in other forms, such as rig parameters representing the facial pose.

The facial animation generative model 604 comprises a conditional generative model that has been trained to learn a mapping from an embedding/latent space to a space of face poses, conditioned on speech audio. The facial animation generative model 604 may comprise a decoder of a trained conditional variational autoencoder, as described in relation to FIG. 2 for example. Additionally or alternatively, the facial animation generative model 604 may comprise one or more of: a generator neural network of a conditional generative adversarial neural network; a conditional flow-based model, which is optionally a conditional normalizing flow model; and a conditional denoising diffusion model.

The method 600 involves processing speech audio data 601 representing speech audio. Speech audio data 601 may comprise any suitable representation of speech audio, e.g. a waveform of speech audio, acoustic features of speech audio etc. The speech audio data 601 may comprise data (e.g. amplitudes, acoustic features, etc.) for each time step of a plurality of time steps. The data associated with a time step may be referred to as a speech audio frame.

Speech audio data 601 is received by the speech emotion recognition model 602. The speech emotion recognition model 602 comprises a machine-learned model that has been trained to generate/extract emotion representations from speech audio, as described in relation to FIG. 5 for example. The emotion representations represent the speech emotion of the speech audio. A global emotion representation may be generated for the entire speech audio, representing an overall speech emotion for the speech audio. Additionally or alternatively, an emotion representation may be generated for each time step of a plurality of time steps (e.g. for each speech audio frame of the speech audio data 601). An emotion representation may comprise one or more emotion classifications such as "Happy", "Sad", "Angry", "Neutral" etc. Such an emotion representation may further comprise a score/probability for each emotion classification in a set of emotion classifications, e.g.: "'Happy': 80%, 'Sad': 0%, 'Angry': 15%, 'Neutral': 5%". Additionally or alternatively, an emotion representation may comprise arousal and/or valence values which may have positive or negative values.

For each emotion representation, a conditioning input is determined from a set of conditioning inputs in the form of a latent codebook 603. The latent codebook 603 may be determined in any appropriate manner, and may be predetermined prior to performing method 600. For example, after training of the facial animation generative model 604, different latent vectors may be applied as input to the facial animation generative model 604 to determine the effect on the resulting facial animations. Particular latent vectors may be stored in the latent codebook 603 along with an association of a particular speech emotion. For example, a latent vector that results in facial animations portraying a happy facial expression may be stored along with an indication of a happy speech emotion.

The conditioning input for an emotion representation may be determined in any appropriate manner. For example, the emotion representation may indicate a particular emotion classification, such as "happy". This may be determined by configuring the speech emotion recognition model 602 to generate a score/probability for each emotion classification in a set of emotion classifications. If the score/probability for the "happy" emotion classification is greater than the scores/probabilities for the other emotion classifications, the emotion representation may indicate a "happy" speech emotion. Subsequently, a conditioning input associated with the "happy" speech emotion may be retrieved from the latent codebook 603 and provided as a conditioning input to the facial animation generative model 604.

As another example, a conditioning input may be determined based on a combination of vectors stored in the set of conditioning inputs 603. For example, if the speech emotion recognition model 602 indicates a 70% probability for the "happy" emotion classification, and a 30% probability for the "sad" emotion classification, a conditioning input formed from a combination of vectors from the set of conditioning inputs 603 may be determined as follows. A vector for the "happy" emotion classification may be retrieved from the latent codebook 603 and weighted by 0.7 (e.g. by performing elementwise multiplication). Similarly, a vector for the "sad" emotion classification may be retrieved from the latent codebook 603 and weighted by 0.3. The two weighted vectors may be summed together to determine a conditioning input for the facial animation generative model 605.

The facial animation generative model 604 receives the conditioning inputs and input data derived from the speech audio data 601. The input data may be the speech audio data 601, or the speech audio data 601 may be processed before input to the facial animation generative model 604. For example, if the speech audio data 601 comprises a waveform of speech audio data, acoustic features of the speech audio data 601 may be determined and subsequently provided as input to the facial animation generative model 604. As another example, the speech audio data 601 may be processed by a speech processing neural network (e.g. a speech transcription neural network). Outputs generated by one or more neural network layers of the speech processing neural network may be provided as input to the facial animation generative model 604. The input data may comprise data for each time step of a plurality of time steps.

The facial animation generative model 604 processes the conditioning inputs and input derived from speech audio data 601 and generates facial animation data 605. The facial animation data 605 may be facial animation data for a particular animation frame. For example, the facial animation generative model 604 may process a conditioning input and a speech audio frame of the speech audio data 601 and generate facial animation data 605 for a corresponding animation frame. In this way, a facial animation can be generated, e.g. by generating facial animation data 605 for each of a plurality of animation frames.

In some embodiments, the facial animation data 605 may comprise mesh data for a facial mesh. Mesh data defines a configuration (e.g. the 3D shape) of at least part of a facial mesh. Mesh data may for example specify the position of elements of the facial mesh such as vertices and/or edges. In some examples, mesh data may define the configuration (e.g. shape) of a mesh by specifying a deformation or transformation from a default/neutral facial mesh configuration. Mesh data may be represented as a vector defining coordinates for each vertex of a plurality of vertices.

In some embodiments, the facial animation data 605 may comprise rig parameters for a facial animation rig. A facial animation rig may be used to provide controls (rig parameters) for animators to modify face poses. The facial animation rig defines a model that transforms rig parameters into mesh data for the facial pose. The facial animation rig may be skeletal-based, wherein the controls define the configuration (e.g. rotation) of various joints of a skeleton, and the mesh is generated/deformed based on the configuration of the joints. Additionally or alternatively, the facial animation rig may be based on blend shapes (or any other suitable set of basis shapes) that define modifications of the mesh (e.g. from a default/neutral configuration of the mesh), wherein the controls define how different blend shapes are combined. A weight may be determined for each of the blend shapes from the controls, and the mesh may be generated using the blend shapes and their respective weights. Rig parameters may be represented as a vector defining the rig parameters.

The facial animation generative model 604 may be trained in a similar method to the training described in relation to FIG. 2 of the decoder of the cVAE. In this way, facial animation generative model 604 can be used to generate facial animations in accordance with the speech sounds and speech emotion of speech audio. The facial animation data 605 is used to animate various facial elements, e.g. eyes, eyebrows, nose, cheeks, jaws, mouth, tongue, etc. The facial animation generative model 604 may be used to generate facial animation data 605 for a particular facial element instead of a whole face.

Additionally or alternatively, instead of using a latent codebook 603, outputs generated by speech emotion recognition model 602 may be used to form a conditioning input. In these examples, the speech emotion recognition model 602 may generate emotion representations comprising an embedding/encoding produced by the speech emotion recognition model 602 (e.g. as generated by one or more neural network layers preceding an output layer of the speech emotion recognition model 602). A conditioning input may be determined based on outputs generated as a result of the speech emotion recognition model processing the embeddings/encodings. For example, the outputs may comprise a score/probability for each of the emotion classifications and the scores/probabilities may form a conditioning input. As another example, a highest scoring emotion classification may be determined using the outputs, and an indication of the highest scoring emotion classification may form a conditioning input. FIG. 7 illustrates an example method of generating facial animation data in this manner.

Figure 7:
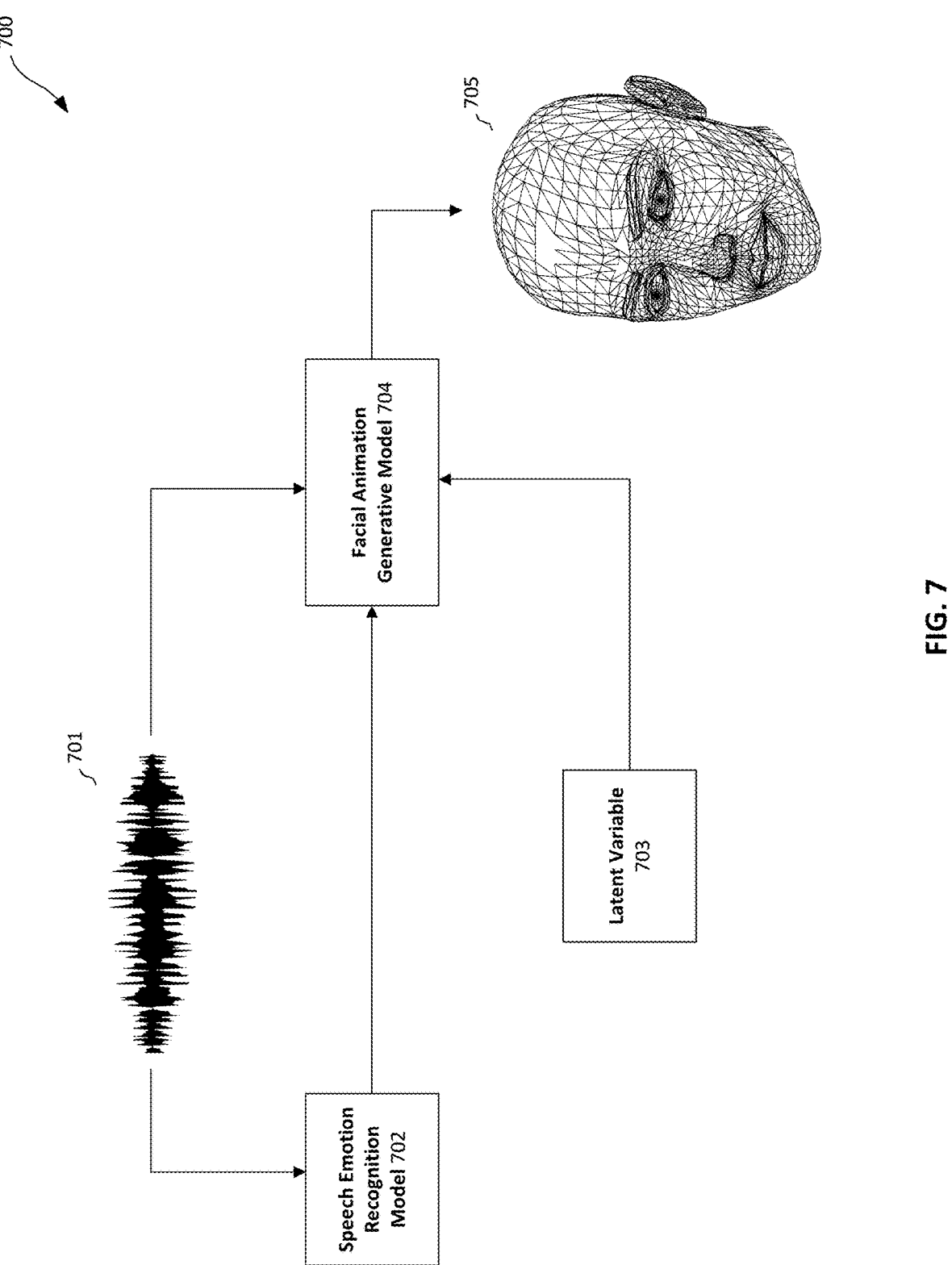
FIG. 7 illustrates another example method for generating facial animation data using a facial animation generative model.

FIG. 7 illustrates another example method 700 for generating facial animation data 705 using a facial animation generative model 704. In this example, outputs produced as a result of speech emotion recognition model 702 processing speech audio data 701 are used to form a conditioning input to the facial animation generative model 704. The conditioning input may comprise an indication of a particular emotion classification (e.g. a highest scoring emotion classification, as determined by the outputs of the speech emotion recognition model 702). As another example, the conditioning input may comprise a score/probability for each emotion classification in a set of emotion classifications, as specified by the outputs of the speech emotion recognition model 702. As another example, the conditioning input may comprise emotion values (e.g. arousal and/or valence values), as specified by the outputs of the speech emotion recognition model 702.

In this example method, the latent variable 703 may be used to model variations in face poses that are agnostic to both speech sounds and speech emotion of speech audio.

The facial animation generative model 704 may be trained in a similar method to the training described in relation to FIG. 2 of the decoder of the cVAE. However, the training examples used to train the facial animation generative model 704 may further comprise a manually determined speech emotion label/representation that is provided as a conditioning input to the facial animation generative model 704. After training, ground-truth speech emotion labels/representations might not be provided for new examples of speech audio. A suitable conditioning input can be determined from outputs generated by the speech emotion recognition model 702 from processing speech audio data 701 representing the new example of speech audio.

Figure 8:
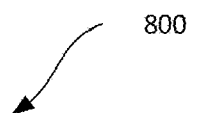
FIG. 8 is a flow diagram illustrating an example method for generating facial animation data.
Figure 8:
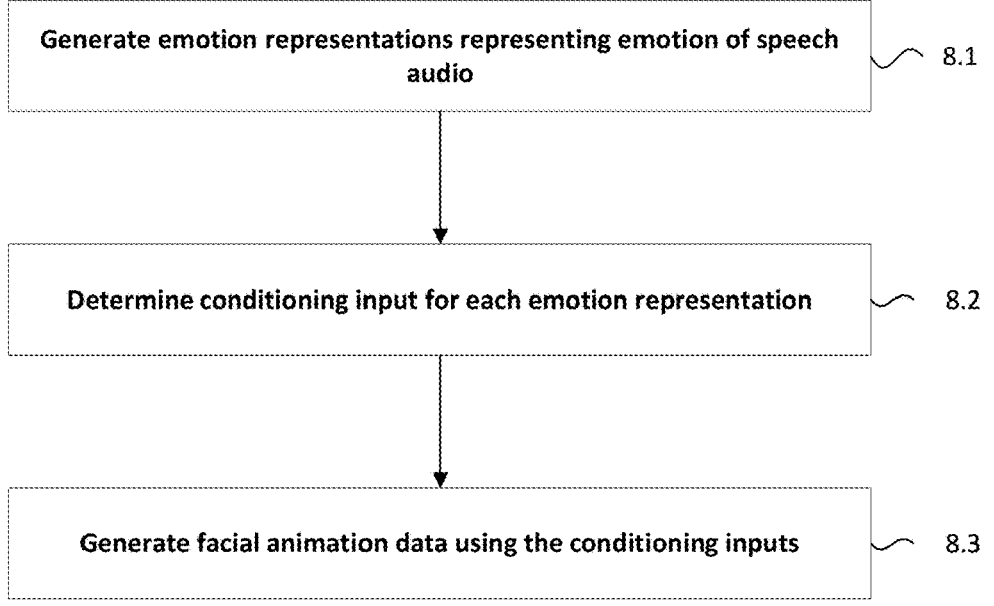

FIG. 8 is a flow diagram illustrating an example method 800 for generating facial animation data.

In step 8.1, one or more emotion representations representing an emotion of speech audio are generated. This comprises processing, using a speech emotion recognition model, speech audio data representing the speech audio.

Each of the one or more emotion representations may comprise one or more emotion classifications. Generating the one or more emotion representations that represent the emotion of the speech audio may comprise, for each emotion representation, generating a respective score for each emotion classification of the set of emotion classifications.

Generating the one or more emotion representations may comprise generating a global emotion representation that represents the emotion of the entire speech audio. Additionally or alternatively, generating the one or more emotion representations may comprise generating an emotion representation for each time step of a plurality of time steps of the speech audio data. This may comprise processing speech audio data of the time step using the speech emotion recognition model.

Each of the one or more emotion representations may comprise an emotion embedding/encoding generated by the speech emotion recognition model. For example, emotion embeddings/encodings may be provided in the form of an intermediate output (e.g. an output of an intermediate neural network layer that precedes an output layer of the speech emotion recognition model). The intermediate output may be generated by processing the speech audio data using the speech emotion recognition model.

In step 8.2, a conditioning input is determined for each emotion representation. The conditioning input(s) are conditioning input(s) for a facial animation generative model.

The facial animation generative model may comprise at least one of: a decoder of a conditional variational autoencoder; a generator neural network of a conditional generative adversarial neural network; a conditional flow-based model, which is optionally a conditional normalizing flow model; and a conditional denoising diffusion model.

Each of the one or more conditioning inputs may be determined using a set of pre-determined conditioning inputs. Each conditioning input of the set of pre-determined conditioning inputs may be associated with a respective emotion classification from a set of emotion classifications.

Determining, for each of the one or more emotion representations, the respective conditioning input for the facial animation generative model may comprise: for each of the one or more emotion classifications, weighting the associated pre-determined conditioning input based on the respective score. This may further comprise summing together the weighted pre-determined conditioning inputs to generate the respective conditioning input for the facial animation generative model.

Additionally or alternatively, determining, for each of the one or more emotion representations, the respective conditioning input for the facial animation generative model may comprise selecting the pre-determined conditioning input associated with a highest-scoring emotion classification.

Determining, for each of the one or more emotion representations, the respective conditioning input may comprise determining a global conditioning input for the entire speech audio. Additionally or alternatively, determining, for each of the one or more emotion representations, the respective conditioning input may comprise determining a conditioning input for each time step using an emotion representation generated for the time step.

Conditioning inputs may be determined from outputs produced by the speech emotion recognition model from processing the speech audio data. An emotion representation in the form of an emotion encoding/embedding may be produced as an intermediate output of the speech emotion recognition model. The emotion encoding/embeddings may be processed by an output portion of the speech emotion recognition model to generate outputs. The outputs may be used to form a conditioning input. The conditioning input may comprise an indication of a particular emotion classification (e.g. a highest scoring emotion classification, as determined by the outputs of the speech emotion recognition model). As another example, the conditioning input may comprise a score/probability for each emotion classification in a set of emotion classifications, as specified by the outputs of the speech emotion recognition model. As another example, the conditioning input may comprise emotion values (e.g. arousal and/or valence values), as specified by the outputs of the speech emotion recognition model.

In step 8.3, facial animation data is generated using the conditioning inputs. This comprises processing, using the facial animation generative model: (i) input data derived from the speech audio data, and (ii) the one or more conditioning inputs.

The input data derived from the speech audio data may comprise acoustic features for each time step of a plurality of time steps of the speech audio data. The acoustic features may comprise spectrogram parameters. Additionally or alternatively, the input data derived from the speech audio data may comprise outputs generated by one or more neural network layers of a speech processing neural network. The outputs may be generated by processing the speech audio data using the speech processing neural network. The speech processing neural network may be a speech transcription neural network.

Generating the facial animation data for the speech audio data may comprise generating, for each time step of a plurality of time steps of the speech audio data, mesh data for a facial mesh. Additionally or alternatively, generating the facial animation data for the speech audio data may comprise generating, for each time step of a plurality of time steps of the speech audio data, rig parameters for a facial animation rig.

Although the technology has been described in the context of video games, it will be appreciated that the methods and systems described herein could alternatively be used in any other area in which animation is used (e.g. film, television etc.)

Figure 9:
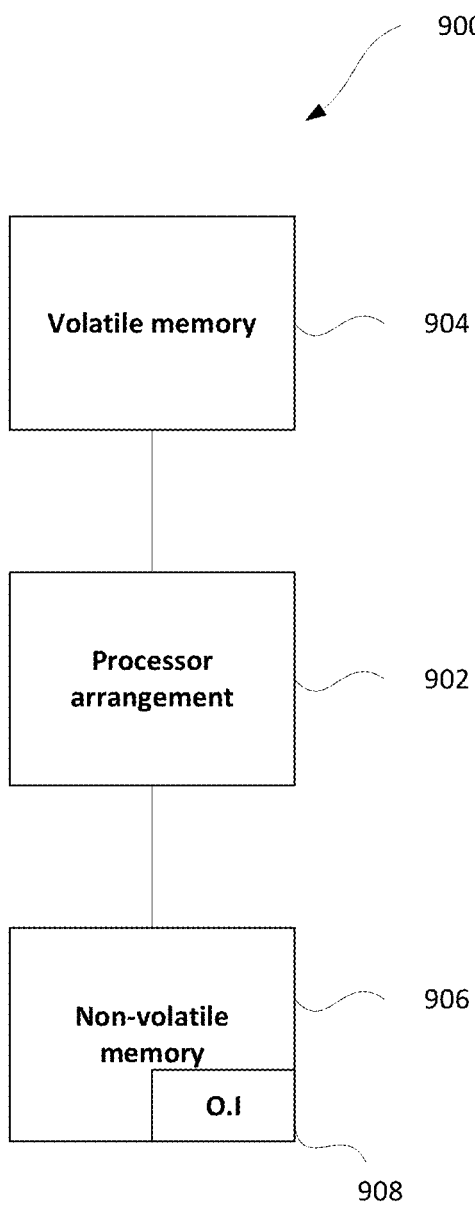
FIG. 9 shows a schematic example of a system/apparatus for performing any of the methods described herein.

FIG. 9 shows a schematic example of a system/apparatus 900 for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 900 comprises one or more processors 902. The one or more processors control operation of other components of the system/apparatus 900. The one or more processors 902 may, for example, comprise a general purpose processor. The one or more processors 902 may be a single core device or a multiple core device. The one or more processors 902 may comprise a central processing unit (CPU) or a graphical processing unit (GPU). Alternatively, the one or more processors 902 may comprise specialised processing hardware, for instance a RISC processor or programmable hardware with embedded firmware. Multiple processors may be included.

The system/apparatus comprises a working or volatile memory 904. The one or more processors may access the volatile memory 904 in order to process data and may control the storage of data in memory. The volatile memory 904 may comprise RAM of any type, for example Static RAM (SRAM), Dynamic RAM (DRAM), or it may comprise Flash memory, such as an SD-Card.

The system/apparatus comprises a non-volatile memory 906. The non-volatile memory 906 stores a set of operation instructions 908 for controlling the operation of the processors 902 in the form of computer readable instructions. The non-volatile memory 906 may be a memory of any kind such as a Read Only Memory (ROM), a Flash memory or a magnetic drive memory.

The one or more processors 902 are configured to execute operating instructions 908 to cause the system/apparatus to perform any of the methods described herein. The operating instructions 908 may comprise code (i.e. drivers) relating to the hardware components of the system/apparatus 900, as well as code relating to the basic operation of the system/apparatus 900. Generally speaking, the one or more processors 902 execute one or more instructions of the operating instructions 908, which are stored permanently or semi-permanently in the non-volatile memory 906, using the volatile memory 904 to temporarily store data generated during execution of said operating instructions 908.

Implementations of the methods, apparatus and/or systems as described herein may be realised as in digital electronic circuitry, integrated circuitry, specially designed ASICs (application specific integrated circuits), system-on-chip (SoC) integrated circuitry, computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 9, cause the computer to perform one or more of the methods described herein.

Implementations of the methods, apparatus and/or systems as described herein may be realised as one or more servers, a plurality of servers and/or computing devices, a distributed system, a cloud-based platform and/or cloud computing system and the like. Thus, for instance, several computing devices and/or servers may be in communication by way of a network connection and may collectively perform tasks described as being performed by the methods, apparatus, computing devices, and/or systems as described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer-implemented method for generating facial animation data that animates a face in a video game in accordance with speech sounds and speech emotion of speech audio, the method comprising:

generating one or more emotion representations that represent the emotion of the speech audio, comprising processing, using a machine-learned speech emotion recognition model, speech audio data representing the speech audio;

wherein each of the one or more emotion representations comprises a respective score for each emotion classification of a set of emotion classifications;

wherein each emotion classification of the set of emotion classifications is associated with a pre-determined conditioning input;

determining, for each of the one or more emotion representations, a respective conditioning input for a facial animation generative model comprising:

for each emotion classification of the set of emotion classifications, weighting the pre-determined conditioning input associated with the emotion classification based on the respective score for the emotion classification generated by the machine-learned speech emotion recognition model; and summing together the weighted pre-determined conditioning inputs to generate the respective conditioning input for the facial animation generative model; and generating facial animation data for the speech audio data, comprising processing, using the facial animation generative model: (i) input data derived from the speech audio data, and (ii) the one or more conditioning inputs.

2. The method of claim 1, wherein determining, for each of the one or more emotion representations, the respective conditioning input for the facial animation generative model comprises selecting the pre-determined conditioning input associated with a highest-scoring emotion classification.

3. The method of claim 1, wherein:

generating the one or more emotion representations comprises generating a global emotion representation that represents the emotion of the entire speech audio; and determining, for each of the one or more emotion representations, the respective conditioning input comprises determining a global conditioning input for the entire speech audio.

4. The method of claim 1, wherein:
generating the one or more emotion representations comprises generating an emotion representation for each time step of a plurality of time steps of the speech audio data, comprising processing speech audio data of the time step using the machine-learned speech emotion recognition model; and
determining, for each of the one or more emotion representations, the respective conditioning input comprises determining a conditioning input for each time step using the emotion representation generated for the time step.

5. The method of claim 1, wherein generating the facial animation data for the speech audio data comprises:
generating, for each time step of a plurality of time steps of the speech audio data, mesh data for a facial mesh.

6. The method of claim 1, wherein generating the facial animation data for the speech audio data comprises:
generating, for each time step of a plurality of time steps of the speech audio data, rig parameters for a facial animation rig.

7. The method of claim 1, wherein the facial animation generative model comprises at least one of:
a decoder of a conditional variational autoencoder;
a generator neural network of a conditional generative adversarial neural network;
a conditional flow-based model, which is optionally a conditional normalizing flow model; and
a conditional denoising diffusion model.

8. A computing system for generating facial animation data that animates a face in a video game in accordance with speech sounds and emotion of speech audio, the computing system comprising one or more computing devices configured to:
generate one or more emotion representations that represent the emotion of the speech audio, comprising processing, using a machine-learned speech emotion recognition model, speech audio data representing the speech audio;
wherein each of the one or more emotion representations comprises a respective score for each emotion classification of a set of emotion classifications;
wherein each emotion classification of the set of emotion classifications is associated with a pre-determined conditioning input;
determine, for each of the one or more emotion representations, a respective conditioning input for a facial animation generative model comprising:
for each emotion classification of the set of emotion classifications, weighting the pre-determined conditioning input associated with the emotion classification based on the respective score for the emotion classification generated by the machine-learned speech emotion recognition model; and
summing together the weighted pre-determined conditioning inputs to generate the respective conditioning input for the facial animation generative model; and
generate facial animation data for the speech audio data, comprising processing, using the facial animation generative model: (i) input data derived from the speech audio, and (ii) the one or more conditioning inputs.

9. The computing system of claim 8, wherein the input data derived from the speech audio data comprises acoustic features for each time step of a plurality of time steps of the speech audio data.

10. The computing system of claim 9, wherein the acoustic features comprise spectrogram parameters.

11. The computing system of claim 8, wherein the input data derived from the speech audio data comprises outputs generated by one or more neural network layers of a speech transcription neural network, wherein the outputs are generated by processing the speech audio data using the speech transcription neural network.

12. The computing system of claim 8, wherein the facial animation generative model comprises at least one of:
a decoder of a conditional variational autoencoder;
a generator neural network of a conditional generative adversarial neural network;
a conditional flow-based model, which is optionally a conditional normalizing flow model; and
a conditional denoising diffusion model.

13. A non-transitory computer-readable medium storing instructions, which when executed by one or more processors, cause the processor to:
generate one or more emotion representations for speech audio, comprising processing, using a machine-learned speech emotion recognition model, speech audio data representing the speech audio;
wherein each of the one or more emotion representations comprises a respective score for each emotion classification of a set of emotion classifications;
wherein each emotion classification of the set of emotion classifications is associated with a pre-determined conditioning input;
determine, for each of the one or more emotion representations, a respective conditioning input for a facial animation generative model comprising:
for each emotion classification of the set of emotion classifications, weighting the pre-determined conditioning input associated with the emotion classification based on the respective score for the emotion classification generated by the machine-learned speech emotion recognition model; and
summing together the weighted pre-determined conditioning inputs to generate the respective conditioning input for the facial animation generative model; and
generate facial animation data for the speech audio data, comprising processing, using the facial animation generative model: (i) input data derived from the speech audio, and (ii) the one or more conditioning inputs.

14. The non-transitory computer-readable medium of claim 13, wherein the input data derived from the speech audio data comprises acoustic features for each time step of a plurality of time steps of the speech audio data.

15. The non-transitory computer-readable medium of claim 14, wherein the acoustic features comprise spectrogram parameters.

16. The non-transitory computer-readable medium of claim 13, wherein the input data derived from the speech audio data comprises outputs generated by one or more neural network layers of a speech transcription neural network, wherein the outputs are generated by processing the speech audio data using the speech transcription neural network.

17. The non-transitory computer-readable medium of claim 16, wherein the facial animation generative model comprises at least one of:

a decoder of a conditional variational autoencoder;

a generator neural network of a conditional generative adversarial neural network;

a conditional flow-based model, which is optionally a conditional normalizing flow model; and a conditional denoising diffusion model.

*   *   *   *   *